United States Patent
Woodward, Jr. et al.

(10) Patent No.: US 10,042,068 B2
(45) Date of Patent: *Aug. 7, 2018

(54) CONVEYANCE SYSTEM AND METHOD FOR UNDERWATER SEISMIC EXPLORATION

(71) Applicant: Fairfield Industries Incorporated, Sugar Land, TX (US)

(72) Inventors: Reagan Neil Woodward, Jr., Sugar Land, TX (US); James N. Thompson, Sugar Land, TX (US)

(73) Assignee: FAIRFIELD INDUSTRIES INCORPORATED, Houston, TX (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/216,067

(22) Filed: Jul. 21, 2016

(65) Prior Publication Data

US 2017/0017007 A1   Jan. 19, 2017

Related U.S. Application Data

(63) Continuation-in-part of application No. 14/106,478, filed on Dec. 13, 2013, now Pat. No. 9,645,271, (Continued)

(51) Int. Cl.
*G01V 1/38* (2006.01)
*B63B 25/28* (2006.01)
(Continued)

(52) U.S. Cl.
CPC .......... *G01V 1/3852* (2013.01); *B63B 25/28* (2013.01); *B63B 27/10* (2013.01); *B63C 11/52* (2013.01);
(Continued)

(58) Field of Classification Search
CPC .............................. G01V 1/3852; B63C 11/52
(Continued)

(56) References Cited

U.S. PATENT DOCUMENTS

| 4,905,404 A | 3/1990 | Pasion et al. |
| 5,253,223 A | 10/1993 | Svenning et al. |

(Continued)

FOREIGN PATENT DOCUMENTS

| WO | WO-01/73477 A2 | 10/2001 |
| WO | WO-02/46793 A1 | 6/2002 |
| WO | WO-2016/066719 | 5/2016 |

OTHER PUBLICATIONS

Final Office Action for U.S. Appl. No. 12/343,136 dated Apr. 25, 2011.
(Continued)

*Primary Examiner* — Ian J Lobo
(74) *Attorney, Agent, or Firm* — Foley & Lardner LLP; James De Vellis

(57) ABSTRACT

A system to deploy seismic sensors in a marine environment is provided. The system includes a seismic sensor transfer device to house and transport a plurality of seismic sensors. The seismic sensor transfer device is deployed from a vessel. The system includes a propulsion system of the seismic sensor transfer device to receive an instruction and move, responsive to the instruction, the seismic sensor transfer device. The system includes an underwater vehicle that transfers at least one of the plurality of seismic sensors from the seismic sensor transfer device to the underwater vehicle. The underwater vehicle operates at a second speed different from a first speed at which the vessel operates. The underwater vehicle places the at least one seismic sensor on a seabed.

20 Claims, 14 Drawing Sheets

Related U.S. Application Data which is a continuation of application No. 13/671,645, filed on Nov. 8, 2012, now Pat. No. 8,611,181, which is a continuation of application No. 12/343,136, filed on Dec. 23, 2008, now Pat. No. 8,310,899.

(51) Int. Cl.
| | | |
|---|---|---|
| *B63B 27/10* | (2006.01) | |
| *B63C 11/52* | (2006.01) | |
| *G05D 1/02* | (2006.01) | |

(52) U.S. Cl.
CPC .......... *G01V 1/3808* (2013.01); *G01V 1/3843* (2013.01); *G05D 1/0206* (2013.01); *G01V 2210/1427* (2013.01)

(58) Field of Classification Search
USPC ............................................ 367/15; 405/190
See application file for complete search history.

(56) References Cited

U.S. PATENT DOCUMENTS

| | | | |
|---|---|---|---|
| 5,271,953 A | 12/1993 | Litteral | |
| 5,442,590 A | 8/1995 | Svenning et al. | |
| 5,811,055 A | 9/1998 | Geiger | |
| 6,273,771 B1 * | 8/2001 | Buckley | B63H 21/213 114/144 RE |
| 6,350,085 B1 | 2/2002 | Bath et al. | |
| 6,371,693 B1 | 4/2002 | Kopp et al. | |
| 6,456,565 B1 | 9/2002 | Grall et al. | |
| 6,474,254 B1 | 11/2002 | Ambs et al. | |
| 6,588,980 B2 | 7/2003 | Worman et al. | |
| 6,612,397 B2 | 9/2003 | Sparrevik et al. | |
| 6,625,083 B2 | 9/2003 | Vandenbroucke | |
| 6,657,921 B1 | 12/2003 | Ambs | |
| 6,951,138 B1 | 10/2005 | Jones | |
| 6,975,560 B2 | 12/2005 | Berg et al. | |
| 6,992,951 B2 | 1/2006 | O'Brien et al. | |
| 7,210,556 B2 | 5/2007 | Bath et al. | |
| 7,254,093 B2 | 8/2007 | Ray et al. | |
| 7,632,043 B2 | 12/2009 | Thompson et al. | |
| 7,965,583 B2 | 6/2011 | Thomas | |
| 8,021,080 B2 | 9/2011 | Frivik et al. | |
| 8,127,706 B2 | 3/2012 | Thompson et al. | |
| 8,310,899 B2 | 11/2012 | Woodard et al. | |
| 8,534,959 B2 | 9/2013 | Thompson et al. | |
| 8,556,540 B2 | 10/2013 | Thompson et al. | |
| 8,579,545 B2 | 11/2013 | Jewell et al. | |
| 8,611,181 B2 | 12/2013 | Woodward et al. | |
| 9,010,431 B2 | 4/2015 | Billington et al. | |
| 9,081,119 B2 | 7/2015 | Norris et al. | |
| 9,096,106 B2 * | 8/2015 | Hanson | B60F 5/00 |
| 9,645,271 B2 * | 5/2017 | Woodward, Jr. | G01V 1/3852 |
| 2001/0028041 A1 | 10/2001 | Hubbard | |
| 2002/0172562 A1 | 11/2002 | Worman et al. | |
| 2003/0218937 A1 | 11/2003 | Berg et al. | |
| 2004/0026346 A1 | 2/2004 | Kelly et al. | |
| 2005/0052951 A1 | 3/2005 | Ray et al. | |
| 2005/0155814 A1 | 7/2005 | Bath et al. | |
| 2005/0276665 A1 | 12/2005 | Entralgo et al. | |
| 2006/0120216 A1 | 6/2006 | Ray et al. | |
| 2006/0159524 A1 | 7/2006 | Thompson et al. | |
| 2006/0243189 A1 | 11/2006 | Thompson et al. | |
| 2006/0286931 A1 | 12/2006 | Rhodes et al. | |
| 2007/0070808 A1 | 3/2007 | Ray et al. | |
| 2007/0248417 A1 | 10/2007 | Berg | |
| 2007/0258774 A1 | 11/2007 | Thompson et al. | |
| 2008/0041296 A1 | 2/2008 | Thompson et al. | |
| 2008/0041298 A1 | 2/2008 | Lin | |
| 2008/0049554 A1 | 2/2008 | Crice et al. | |
| 2008/0144442 A1 | 6/2008 | Combee et al. | |
| 2008/0279636 A1 | 11/2008 | Ray et al. | |
| 2009/0037145 A1 | 2/2009 | Suzuki et al. | |
| 2009/0052992 A1 | 2/2009 | Thompson et al. | |
| 2009/0207697 A1 | 8/2009 | Kitchin et al. | |
| 2011/0158040 A1 | 6/2011 | Kooper et al. | |
| 2011/0217123 A1 | 9/2011 | Jewell et al. | |
| 2013/0187787 A1 | 7/2013 | Damus et al. | |
| 2013/0204456 A1 | 8/2013 | Tippelhofer et al. | |
| 2014/0056108 A1 | 2/2014 | Chelminski | |
| 2014/0153360 A1 | 6/2014 | Tonchia | |
| 2015/0000582 A1 | 1/2015 | Lelaurin et al. | |
| 2015/0049588 A1 | 2/2015 | Lambertus et al. | |
| 2015/0151819 A1 | 6/2015 | Tjom | |
| 2016/0103237 A1 | 4/2016 | Fjellstad et al. | |
| 2016/0121983 A1 | 5/2016 | Rokkan et al. | |
| 2017/0017007 A1 | 1/2017 | Woodward et al. | |
| 2017/0137098 A1 | 5/2017 | Valsvik et al. | |
| 2017/0285203 A1 * | 10/2017 | Fyffe | G01V 1/3852 |

OTHER PUBLICATIONS

International Preliminary Report on Patentability and Written Opinion of the International Searching Authority for Application No. PCT/US2009/069037, dated Jun. 29, 2011, 7 pages.
International Search Report and Written Opinion of the International Searching Authority for PCT/US2008/072469 dated Nov. 19, 2008, 7 pages.
International Search Report for PCT/US2009/069037, dated Aug. 5, 2010, 1 page.
Notice of Allowance for U.S. Appl. No. 13/671,645 dated Oct. 30, 2013.
Notice of Allowance for U.S. Appl. No. 12/343,136 dated Aug. 21, 2012.
Notice of Allowance for U.S. Appl. No. 13/790,284 dated Jun. 6, 2016.
Office Action for U.S. Appl. No. 13/671,645 dated Jun. 3, 2013.
Office Action for U.S. Appl. No. 12/343,136 dated Nov. 22, 2010.
Office Action for U.S. Appl. No. 13/790,284 dated Dec. 17, 2015.
Office Action for U.S. Appl. No. 14/106,478 dated Mar. 7, 2016.
Office Action for U.S. Appl. No. 14/106,489 dated Dec. 23, 2014.
Office Action for U.S. Appl. No. 14/106,489 dated Feb. 16, 2016.
Office Action for U.S. Appl. No. 14/106,489 dated Jul. 10, 2015.
Office Action for U.S. Appl. No. 14/106,489 dated Oct. 23, 2015.
Office Action for U.S. Appl. No. 14/106,489 dated May 13, 2016.
International Search Report and Written Opinion in PCT/US2017/025191, dated Jun. 16, 2017.
International Search Report and Written Opinion on PCT/US2017/025189, dated Jun. 28, 2017.
International Search Report and Written Opinion on PCT/US2017/025190 dated Apr. 28, 2017.
International Search Report and Written Opinion on PCT/US2017/025192, dated Jun. 21, 2017.
Notice of Allowance on U.S. Appl. No. 15/088,049 dated Jul. 19, 2017.
Notice of Allowance on U.S. Appl. No. 15/088,058 dated Mar. 13, 2018.
Notice of Allowance on U.S. Appl. No. 15/216,085 dated Aug. 10, 2017.
Notice of Allowance on U.S. Appl. No. 15/216,085 dated Dec. 21, 2017.
Office Action on U.S. Appl. No. 14/106,478 dated Sep. 27, 2016.
Office Action on U.S. Appl. No. 15/088,054 dated Nov. 17, 2017.
Office Action on U.S. Appl. No. 15/088,060 dated Nov. 29, 2017.
Office Action on U.S. Appl. No. 15/088,058 dated Dec. 26, 2017.
Office Action on U.S. Appl. No. 15/216,085 dated Jun. 13, 2017.
Office Action on U.S. Appl. No. 15/235,863 dated Jan. 25, 2018.
U.S. Notice of Allowance on U.S. Appl. No. 14/106,478 dated Jan. 30, 2017.
U.S. Office Action on U.S. Appl. No. 15/088,049 dated Mar. 6, 2017.

* cited by examiner

CONVEYANCE SYSTEM AND METHOD FOR UNDERWATER SEISMIC EXPLORATION

CROSS-REFERENCES TO RELATED APPLICATIONS

This application claims the benefit of priority under 35 U.S.C. § 120 as a continuation-in-part of U.S. patent application Ser. No. 14/106,478 filed Dec. 13, 2013, which claims the benefit of priority under 35 U.S.C. § 120 as a continuation of U.S. patent application Ser. No. 13/671,645 filed Nov. 8, 2012, which claims the benefit of priority under 35 U.S.C. § 120 as a continuation of U.S. patent application Ser. No. 12/343,136 filed Dec. 23, 2008, each of which are hereby incorporated by reference herein in their entirety.

FIELD OF THE INVENTION

Embodiments described herein relate to the field of seismic exploration in a marine environment. More particularly, to an apparatus and method of transferring seismic equipment to and from an operations platform and an underwater location.

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY OF THE INVENTION

Embodiments described herein relate to an apparatus and method of transferring seismic sensor devices to and from a marine vessel and subsurface location.

Seismic exploration in deep water can utilize seismic sensor devices stored on a first marine vessel that are transferred from the first vessel and placed on or near the seafloor or seabed. These devices are can be referred to as Ocean Bottom Cabling (OBC) or Ocean Bottom Seismometer (OBS) systems, such as Seafloor Seismic Recorders (SSR's). These SSR devices can include seismic sensors and electronics in sealed packages, and record seismic data on-board the devices while deployed on the seabed as opposed to digitizing and transmitting the data to an external recorder while deployed. The recorded data can be obtained by retrieving the devices from the seabed to a location on the first vessel and downloading the recorded data from the devices to a recorder while onboard the first vessel.

In operation, hundreds or thousands of OBS units can be deployed from the first vessel to the seabed from the first vessel. For example, the OBS units can be deployed using a remotely operated vehicle (ROV) tethered to the first vessel. The ROV can be lowered below the surface of the water and positioned subsurface. One or more OBS units can be placed by the ROV on the seabed at predetermined locations in a linear row, such as a receiver line. When at least one receiver line consisting of a suitable number of the OBS units is formed, a seismic survey may be performed by providing a source signal, such as an acoustic or vibrational signal. Reflected signals from the seabed and underlying structures are recorded on the one or more OBS units. The source signal or "shot" is can be provided by a second marine vessel, such as a gun boat.

In the deployment of the OBS units, the speed at which the OBS units can be deployed is primarily limited to the speed at which the equipment can be towed through the water. For example, support equipment for the ROV, such as an umbilical cable and a tether management system (TMS) have large drag coefficients. The drag of these components can limit the speed of the first vessel. Thus, the number of OBS units that can be deployed or retrieved in a given time period is limited. The deployment time can also affects the efficiency of the seismic survey as the second vessel waits until the at least one receiver line is laid prior to shooting. The first vessel continues laying other receiver lines while the second vessel is shooting, but as shooting is often completed prior to completion of the next receiver line, the second vessel again waits until the second receiver line is formed.

The systems, methods and apparatus of the present disclosure transfer seismic sensor devices to and from the first vessel and/or the ROV in a manner that increases or improves the number of seismic sensor devices deployed and retrieved, and provides a buffer for a second vessel.

At least one aspect is directed to a system to deploy seismic sensors in a marine environment. The system can include a seismic sensor transfer device to house and transport a plurality of seismic sensors. The seismic sensor transfer device can be deployed from a vessel. The system can include a propulsion system. The propulsion system can be part of, integrated with, or mechanically coupled to the seismic sensor transfer device. The propulsion system can receive an instruction and move, responsive to the instruction, the seismic sensor transfer device. The system can include an underwater vehicle, such as a remotely operated vehicle or an autonomous under water vehicle. The underwater vehicle can be separate from the seismic sensor transfer device. The underwater vehicle can transfer at least one of the plurality of seismic sensors from the seismic sensor transfer device to the underwater vehicle. The underwater vehicle can operate at a second speed different from a first speed at which the vessel operates. The underwater vehicle can place the at least one seismic sensor on a seabed.

The system can include a control unit to provide the instruction to the propulsion system. The propulsion system can include the control unit. The control unit can be external to, and remote from, the seismic sensor transfer device. The control unit can transmit a wired or wireless transmission comprising the instruction to the propulsion system. The instruction can include an instruction to follow an object moving through an aqueous medium. The instruction can include an instruction to follow the vessel that tows the seismic sensor transfer device through an aqueous medium.

The propulsion system can include an energy source to provide energy. The propulsion system can include an engine to convert the provided energy to mechanical energy to push surrounding water away from the seismic sensor transfer device in a direction opposite a direction of movement of the seismic sensor transfer device. The propulsion system can move the seismic sensor transfer device in a chosen direction. The direction can be chosen via a control unit. For example, the direction can be chosen to cause the seismic sensor transfer device to follow the vessel. The propulsion system can include a means to generate force to push surrounding water away from the seismic sensor transfer device in a direction opposite a direction of movement of the seismic sensor transfer device. The propulsion system can include at least one of: a propeller, a thruster, a paddle, an oar, a waterwheel, a screw propeller, a fixed pitch propeller, a variable pitch propeller, a ducted propeller, an azimuth propeller, a water jet, a fan, or a pump.

The system can include a steering device to control a direction of the movement of the seismic sensor transfer device. The steering device can include a rudder. The system can include a control unit configured to instruct the steering device to control the direction of the movement of the seismic sensor transfer device.

The seismic sensor transfer device can include at least one of a container, a drone, a skid structure, a transfer skid, a basket, a rack, a magazine, or a tray. The seismic sensor transfer device can include a movable platform configured to facilitate transfer of the seismic sensor device.

At least one aspect is directed to a method of deploying seismic sensors in a marine environment. The method can include deploying, from a vessel, a seismic sensor transfer device configured to house and transport a plurality of seismic sensors. The method can include receiving, by a propulsion system of the seismic sensor transfer device, an instruction to move the seismic sensor transfer device. The method can include moving, by the propulsion system responsive to the instruction, the seismic sensor transfer device. The method can include transferring at least one of the plurality of seismic sensors from the seismic sensor transfer device to a remotely operated vehicle. The method can include operating the remotely operated vehicle at a second speed different from a first speed at which the vessel is operating. The method can include placing, by the remotely operated vehicle, the at least one seismic sensor on a seabed.

The method can include providing, by a control unit, the instruction to the propulsion system. The method can include providing, by a control unit remote from and external to the propulsion system, the instruction to the propulsion system via a wired or wireless transmission comprising the instruction. The instruction can include an instruction to follow an object moving through an aqueous medium. The method can include a steering device of the propulsion system controlling a direction of movement of the seismic sensor transfer device.

In some embodiments, a marine vessel is provided. The marine vessel can include a deck having a plurality of seismic sensor devices stored thereon, two remotely operated vehicles, each comprising a seismic sensor storage compartment, and a seismic sensor transfer device comprising a container for transfer of one or more of the seismic sensor devices from the vessel to the sensor storage compartment of at least one of the two remotely operated vehicles.

The marine vessel can include at least three cranes disposed thereon, a plurality of seismic sensor devices stored on the deck, a remotely operated vehicle coupled to the vessel, the remotely operated vehicle comprising a seismic sensor storage compartment, and a seismic sensor transfer device comprising a container for transfer of one or more seismic sensor devices from the vessel to the remotely operated vehicle.

At least one aspect is directed to a method for performing a seismic survey in a marine environment is provided. The method can include deploying a first remotely operated vehicle from a first vessel moving in a direction, deploying a seismic sensor transfer device from the first vessel having a plurality of sensor devices disposed therein, transferring the plurality of sensor devices from the seismic sensor transfer device to a sensor storage compartment of the first remotely operated vehicle at a subsurface location, and placing each of the first plurality of sensor devices in selected locations in the marine environment using the first remotely operated vehicle.

At least one aspect is directed to a method for performing a seismic survey in a marine environment is provided. The method can include deploying a first remotely operated vehicle from a first vessel, the first vessel powered to operate in a direction at a speed greater than zero knots, placing a first plurality of sensor devices in selected locations in the marine environment using the first remotely operated vehicle, deploying a seismic sensor storage container from the first vessel having a second plurality of sensor devices disposed thereon, and transferring the second plurality of sensor devices to the first remotely operated vehicle at a subsurface location.

At least one aspect is directed to a method for performing a seismic survey in a marine environment is provided. The method can include deploying a remotely operated vehicle from a vessel, powering the vessel to operate at a first speed in a first direction, the first speed being greater than zero knots, operating the remotely operated vehicle at a second speed to deploy a first plurality of sensor devices, the second speed being greater than the first speed at intermittent intervals, wherein the remotely operated vehicle deploys the first plurality of sensor devices in a pattern relative to the first direction of the vessel, deploying a seismic sensor container from the vessel, the seismic sensor container having a second plurality of sensor devices disposed thereon, and transferring the second plurality of sensor devices onto the remotely operated vehicle.

At least one aspect is directed to a method for performing a seismic survey in a marine environment is provided. The method can include deploying at least a first remotely operated vehicle from a vessel, the first remotely operated vehicle comprising an onboard sensor storage compartment, loading the onboard sensor storage compartment with a plurality of sensor devices, operating the vessel in a first direction, and placing the sensor devices in a pattern in the marine environment, wherein the pattern comprises at least three linear rows of sensor devices relative to the first direction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is also contemplated that elements disclosed in one embodiment may be beneficially utilized on other embodiments without specific recitation.

DETAILED DESCRIPTION

Figure 1A:
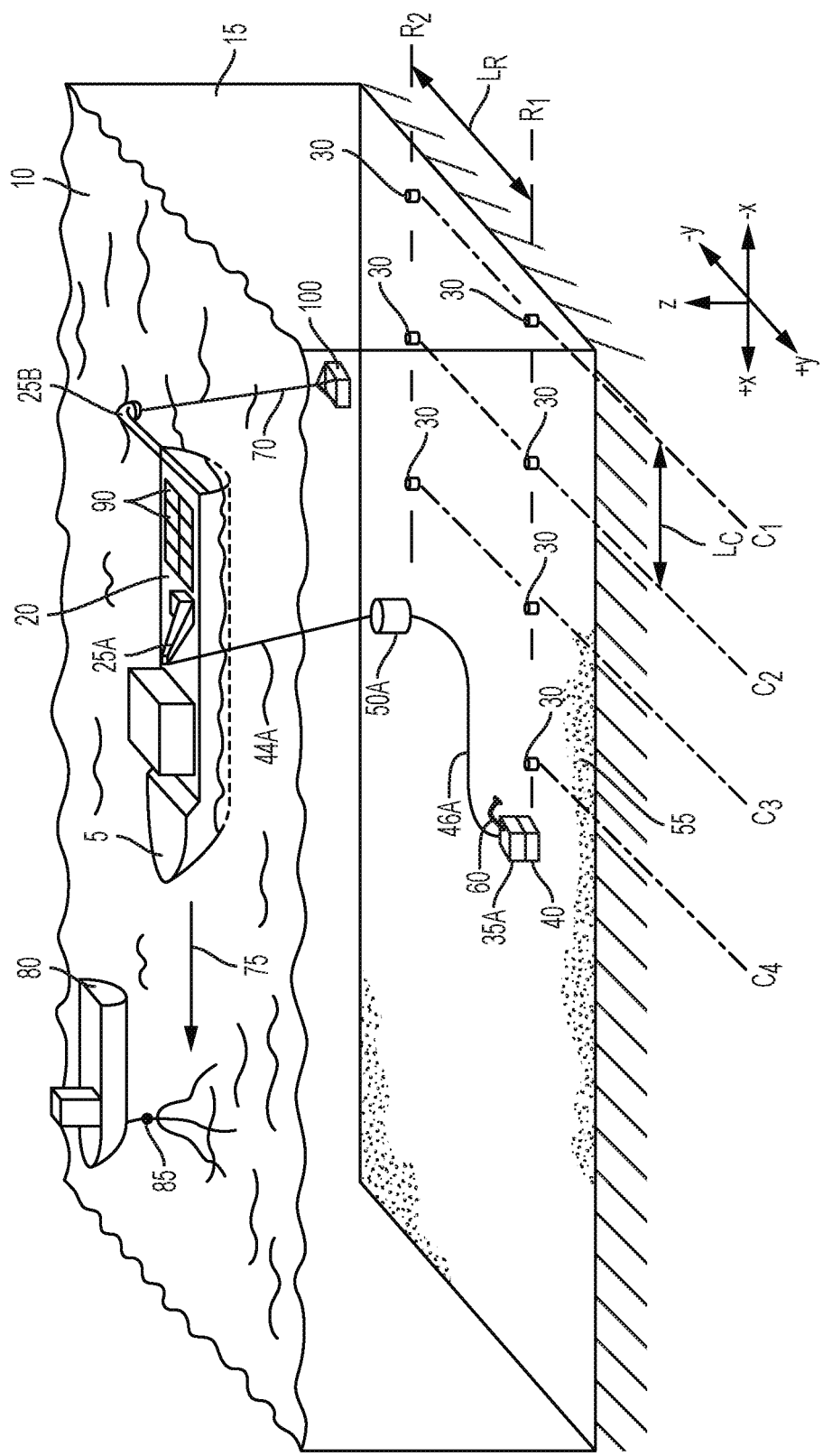
FIG. 1A is an isometric schematic view of an embodiment of a seismic operation in deep water.

Embodiments described herein relate to systems, methods, and apparatus for transferring one or more seismic sensor devices to or from a marine vessel on a surface of a body of water and a subsurface marine location using a seismic sensor transfer device and an underwater vehicle such as a remotely operated vehicle (ROV). The ROV may be an autonomous underwater vehicle (AUV) or any apparatus capable of operating autonomously or semi-autonomously in a marine environment. The marine vessel may be a boat, a ship, a barge or a floating platform adapted to store and transfer a plurality of seismic sensor devices. Each of the seismic sensor devices as described herein may be a discrete subsurface sensor, for example, sensors and/or recorders, such as ocean bottom seismometers (OBS), seafloor seismic recorders (SSR), and similar devices. SSR's are typically re-usable and may be recharged and serviced before re-deployment. The seismic sensor devices may be configured to communicate by wireless connections or configured to communicate through cables. The seismic sensor devices contain seismic sensors and electronics in sealed packages, and record seismic data within an on-board recorder while deployed on the seabed as opposed to digitizing and transmitting the data to an external recorder. The recorded data is obtained by retrieving the seismic sensor devices from the seabed using the ROV or AUV.

The system can include a propulsion system. The seismic sensor transfer device can include the propulsion system. The propulsion system can move the seismic sensor transfer device through the aqueous medium. The propulsion system can include a propeller or other thruster that can move the case through water. For example, the seismic sensor transfer device can be towed by the vessel via a cable. When the vessel turns, for example, the seismic sensor transfer device may at least initially continue in a direction the vessel was moving prior to turning. Thus, the seismic sensor transfer device may not be at a desired location in the aqueous medium or water column as the vessel turns. The propulsion system can move the seismic sensor transfer device such that the seismic sensor transfer device follows the vessel. For example, the propulsion system can include a steering device or mechanism and thruster to move the seismic sensor transfer device in a desired direction such that the case follows the vessel. The propulsion can include a local control unit, or the propulsion system can receive instructions from a remote control unit. The propulsion system can receive instructions to move in a direction. The propulsion system can receive an instruction to move in a direction with a predetermined amount of force. Thus, the propulsion system can allow the seismic sensor transfer device to follow a position of the vessel or boat as the vessel or boat travels through the aqueous medium.

FIG. 1 is an isometric schematic view of one embodiment of a seismic operation in deep water facilitated by a first marine vessel 5. The first vessel 5 is positioned on a surface 10 of a water column 15 and includes a deck 20 which supports operational equipment. At least a portion of the deck 20 includes space for a plurality of sensor device racks 90 where seismic sensor devices are stored. The sensor device racks 90 may also include data retrieval devices and/or sensor recharging devices.

The deck 20 also includes one or more cranes 25A, 25B attached thereto to facilitate transfer of at least a portion of the operational equipment, such as an ROV and/or seismic sensor devices, from the deck 20 to the water column 15. For example, a crane 25A coupled to the deck 20 is configured to lower and raise an ROV 35A, which transfers and positions one or more sensor devices 30 on a seabed 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device and/or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, and/or a propulsion system 105. Alternatively, the transfer device 100 may not include any integral power devices and/or not require any external or internal power source. If needed, the cable 70 may provide power and/or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit. During recording, the seismic sensor device 30 may operate in a self-contained manner such that the node does not require external communication or control. The seismic sensor device 30 may include several geophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for and/or include drift caused by wave action, current(s) and/or wind speed and direction. In one embodiment, the plurality of seismic sensor devices 30 are placed on the seabed 55 in selected locations, such as a plurality of rows $R_n$ in the X direction ($R_1$ and $R_2$ are shown) and/or columns $C_n$ in the Y direction ($C_1$-$C_3$ are shown), wherein n equals an integer. In one embodiment, the rows $R_n$ and columns $C_n$ define a grid or array, wherein each row $R_n$ comprises a receiver line in the width of a sensor array (X direction) and/or each column $C_n$ comprises a receiver line in a length of the sensor array (Y direction). The distance between adjacent sensor devices 30 in the rows is shown as distance $L_R$ and the distance between adjacent sensor devices 30 in the columns is shown as distance $L_C$. While a substantially square pattern is shown, other patterns may be formed on the seabed 55. Other patterns include non-linear receiver lines and/or non-square patterns. The pattern(s) may be pre-determined or result from other factors, such as topography of the seabed 55. In one embodiment, the distances $L_R$ and $L_C$ may be substantially equal and may include dimensions between about 60 meters to about 400 meters, or greater. The distance between adjacent seismic sensor devices 30 may be predetermined and/or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions and/or currents in the water column 15. As the components of the ROV 35A are subject to drag that is dependent on the depth of the components in the water column 15, the first vessel speed may operate in a range of less than about 1 knot. In this embodiment, wherein two receiver lines (rows $R_1$ and $R_2$) are being laid, the first vessel includes a first speed of between about 0.2 knots and about 0.6 knots. In other embodiments, the first speed includes an average speed of between about 0.25 knots, which includes intermittent speeds of less than 0.25 knots and speeds greater than about 1 knot, depending on weather conditions, such as wave action, wind speeds, and/or currents in the water column 15.

During a seismic survey, one receiver line, such as row $R_1$ may be deployed. When the single receiver line is completed a second vessel 80 is used to provide a source signal. The second vessel 80 is provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row $R_1$ in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows $R_1$ and $R_2$) in any number of columns, which may produce a length of each receiver line of up to and including several miles. In one embodiment, the two receiver lines (rows $R_1$ and $R_2$) are substantially parallel. When a single directional pass of the first vessel 5 is completed and the first set (rows $R_1$, $R_2$) of seismic sensor devices 30 are laid to a predetermined length, the second vessel 80, provided with the source device 85, is utilized to provide the source signal. The second vessel 80 is typically required to make eight or more passes along the two receiver lines to complete the seismic survey of the two rows $R_1$ and $R_2$.

While the second vessel 80 is shooting along the two rows $R_1$ and $R_2$, the first vessel 5 may turn 180 degrees and travel in the −X direction in order to lay seismic sensor devices 30 in another two rows adjacent the rows $R_1$ and $R_2$, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows $R_1$ and $R_2$ are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A and/or the spacing (distance $L_R$) between sensor devices 30.

Figure 1B:
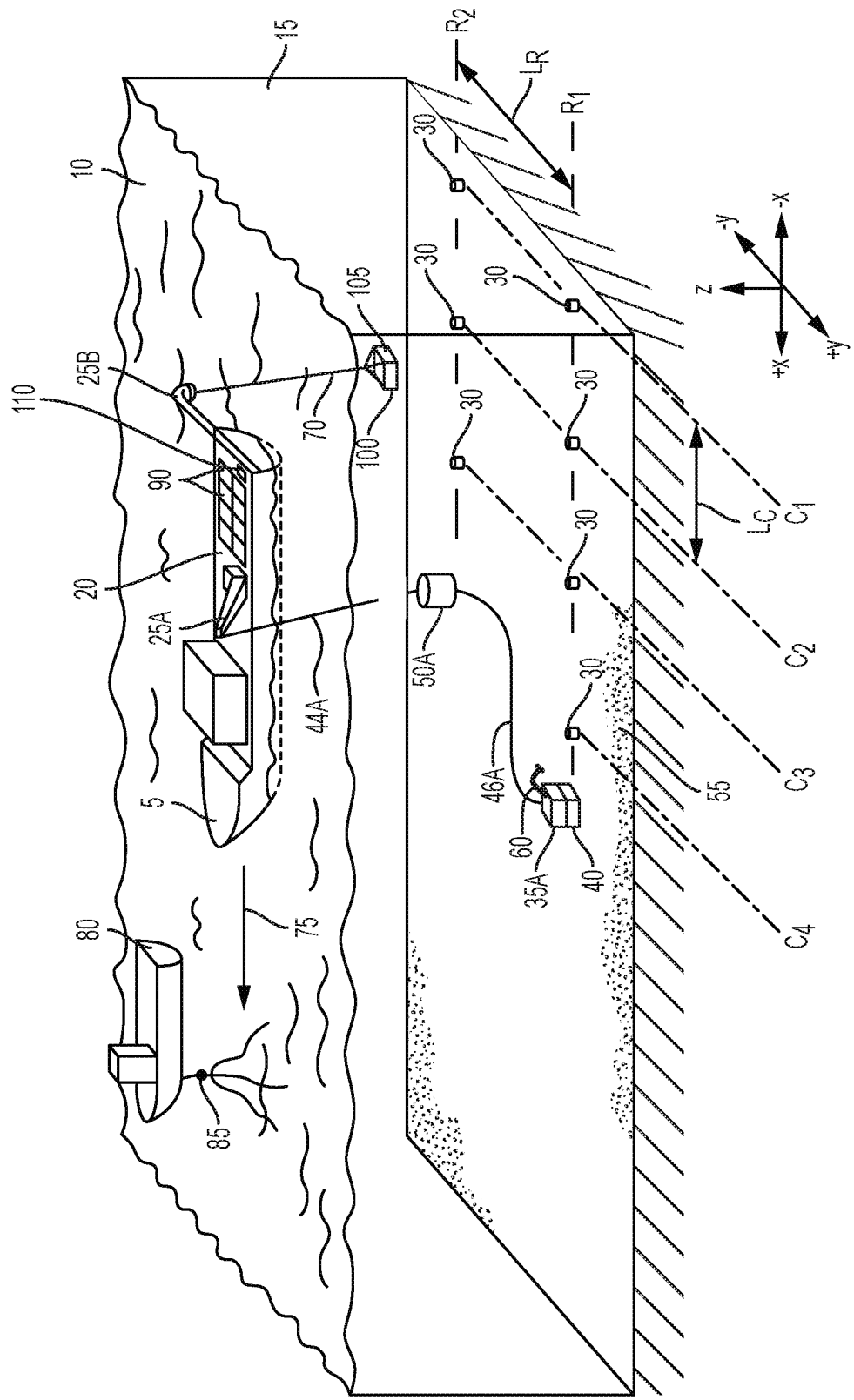
FIG. 1B is an isometric schematic view of an embodiment of a seismic operation in deep water.

FIG. 1B is an isometric schematic view of an embodiment of a seismic operation in deep water. FIG. 1B illustrates an embodiment of the seismic operation comprising a propulsion system 105 to move the transfer device 100 such that the transfer device 100 can follow the marine vessel 5. The propulsion system 105 can move the transfer device 100 as the transfer device 100 is towed by the marine vessel 5. Thus, the seismic sensor transfer device 100 can be self-propelled. The marine vessel 5 can tow the transfer device 100 using a crane 25B. The crane 25B can tow the transfer device 100 using a cable 70. The cable 70 can include a rope or other type of cable configured to mechanically couple the transfer device 100 to the crane such that the marine vessel 5 can tow the transfer device 100 through the aqueous medium.

The system can include a control unit 110. The control unit 110 can be located on the deck 20 of the marine vessel 5. The control unit 110 can be referred to as a remote control unit 110. The control unit 110 can be placed under the deck 20, such as in a computer room or server room. The control unit 110 can be placed on land and communicate via wireless communications to the propulsion system 105.

The control unit 110 can provide instructions to the propulsion system 105. The control unit 110 can provide instructions to the propulsions system 105 to cause the transfer device 100 to follow the marine vessel 5. For example, the control unit 110 can instruct the propulsions system 105 to steer the transfer device 100 to the left or the right. The control unit 110 can instruct the propulsion system 105 to steer or move the transfer device based on a steering or motion of the vessel 5. For example, the control unit 110 can be communicatively coupled to a steering mechanism of the vessel 5. The control unit 110 can receive an indication that the vessel 5 is moving towards a first direction at a first rate. The control unit 110 can determine, based on the received indication, a direction in which the transfer device 100 is to move in order for the transfer device to follow the vessel 5 at a desired location. The control unit 110 can further determine, based on the received indication, a rate at which the transfer device 100 is to move to follow the vessel 5 at the desired location. The desired location can be, for example, a distance from an end of the vessel 5 (e.g., the backend of the vessel). The desired location can include, for example, an X-Y coordinate relative to the vessel 5. The X-Y coordinate can refer to an X-Y coordinate on a horizontal plane parallel to the deck 20 of the vessel 5. The X-axis can extend along a width of the deck 20, and the Y-axis can extend along a length of the deck 20. For example, a corner at the backend of the deck 20 of the vessel 5 can refer to X-Y coordinate (0,0), and the desired location can be (5 meters, 100 meters). The control unit 110 can provide instructions to the propulsion system 105 to maintain the transfer device 100 at the desired location. In some embodiments, the desired location can include a single coordinate, such as an x-coordinate. For example, the y-coordinate can be fixed based on the length of the cable 70, so the propulsion system 105 can control the movement in the x-axis.

Figure 2:
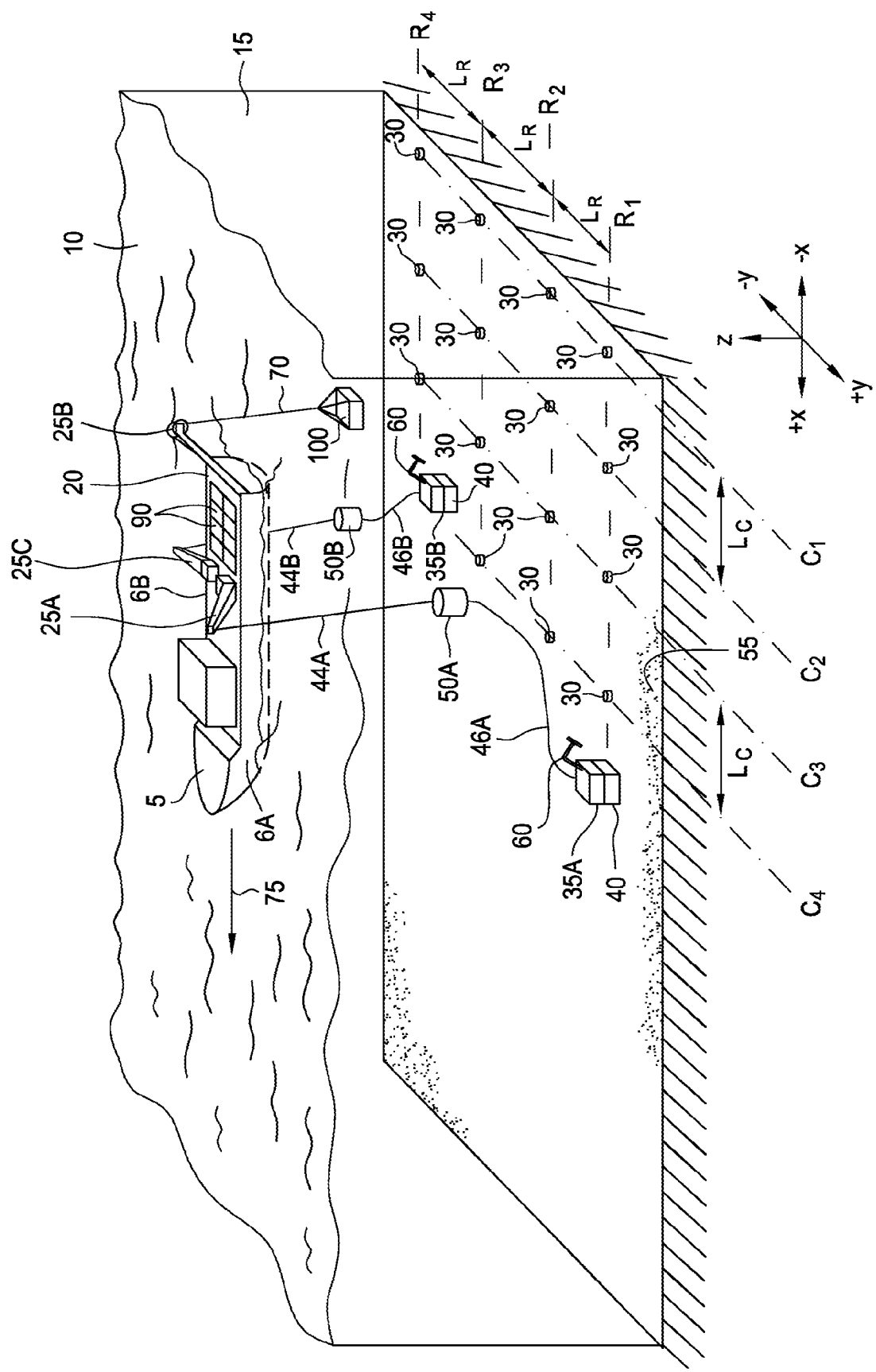
FIG. 2 is an isometric schematic view of an embodiment of a seismic operation in deep water.

FIG. 2 is an isometric schematic view of another embodiment of a seismic operation in deep water facilitated by the first vessel 5. In this embodiment, the first vessel 5 has multiple ROV's operating therefrom. In FIG. 2, by way of example and not limitation, two ROV 35A and ROV 35B are shown. Each of the ROV's 35A, 35B include a respective TMS 50A, 50B, tether 46A, 46B, and umbilical cable 44A, 44B. The first ROV 35A is coupled to the first crane 25A on the port side 6A of the first vessel 5 and the second ROV 35B is coupled to a third crane 25C on the starboard side 6B of the first vessel 5.

The first ROV 35A and the second ROV 35B are configured to provide a layout pattern for the plurality of sensor devices 30 on the seabed 55 on both sides of the first vessel 5. Each of the ROV's 35A and 35B may be controlled independently or synchronously to travel in a direction or course relative to the vessel 5 to deploy the sensor devices 30 on the seabed in a pre-determined pattern. In one aspect, each of the ROV's 35A and 35B deploy a plurality of rows and columns as described above. In the embodiment depicted in FIG. 2, rows $R_1$-$R_4$ and columns $C_1$-$C_4$ define, respectively, the width and the length of a seismic array.

In this embodiment, ROV 35A moves in a first pattern relative to the vessel direction 75 to deploy a plurality of rows of sensor devices 30 (rows $R_1$ and $R_2$ are shown) while ROV 35B moves in a second pattern relative to the vessel direction 75 to deploy a plurality of rows of sensor devices 30 (rows $R_3$ and $R_4$ are shown). The pattern of the first ROV 35A may be the same or different than the pattern of the second ROV 35B. The distance between adjacent sensor devices 30 in the rows $R_1$-$R_4$ is shown as distance $L_R$ and the distance between adjacent sensor devices 30 in the columns $C_1$-$C_4$ is shown as distance $L_C$. While a substantially square pattern is shown, other patterns may be formed on the seabed 55. Other patterns include non-linear receiver lines and/or non-square patterns. The pattern(s) may be predetermined or result from other factors, such as topography of the seabed 55. In one embodiment, the distances $L_R$ and $L_C$ may be substantially equal and may include dimensions between about 60 meters to about 400 meters, or greater. The distance between adjacent seismic sensor devices 30 may be predetermined and/or result from topography of the seabed 55 as described above.

In the embodiment shown, the rows $R_1$-$R_4$ form a first set of four receiver lines and the rows are complete when a sufficient number of columns are provided. Once the first set is completed, the second vessel may provide the source signal. In this embodiment, the second vessel must make at least 16 passes to shoot the four rows $R_1$-$R_4$. During this time, the first vessel 5 is laying a second set of receiver lines, which may include four rows. Thus, the deployment time of the four receiver lines (rows $R_1$-$R_4$) by the vessel 5 is effectively reduced by about 25 percent as compared to deployment of a single receiver line. The minimized deployment time results in less idle time of the second vessel, which results in greater efficiency and reduced costs of the seismic survey.

As in the embodiment shown in FIG. 1, the rows $R_1$, $R_2$ formed by ROV 35A and rows $R_3$, $R_4$ formed by the ROV 35B are not limited as described and may consist of three, four, five, six, or greater number of rows. In one example, each of the ROV's 35A, 35B may lay four sensor devices 30 to form four rows such that eight sensor devices 30 comprise each column. In this example, when a sufficient number of columns are provided to form the rows, eight receiver lines define the present width of the array. The lateral pattern (Y direction) used to deploy each row is typically chosen to maintain forward motion of the vessel 5 and minimize stopping forward motion of the vessel 5. Thus the lateral pattern to deploy additional rows may be limited by the speed of the ROV's 35A, 35B, specifically the speed of the ROV's 35A, 35B in the Y direction. The lateral (Y direction) distance from the first vessel 5 is limited by a length of the tethers 46A, 46B. Thus, in one embodiment, the maximal distance for placement of seismic sensor devices 30 in rows $R_1$ and $R_4$ from the first vessel 5 is substantially equal to the length of the tethers 46A, 46B. In this embodiment, the maximal distance from the first vessel 5 where the seismic sensor devices 30 in rows $R_1$ and $R_4$ are positioned are between about 600 meters to about 1200 meters, or greater from the first vessel 5. In other embodiments, the maximal distance is between about 1000 meters to about 1600 meters from the first vessel 5.

Figure 3:
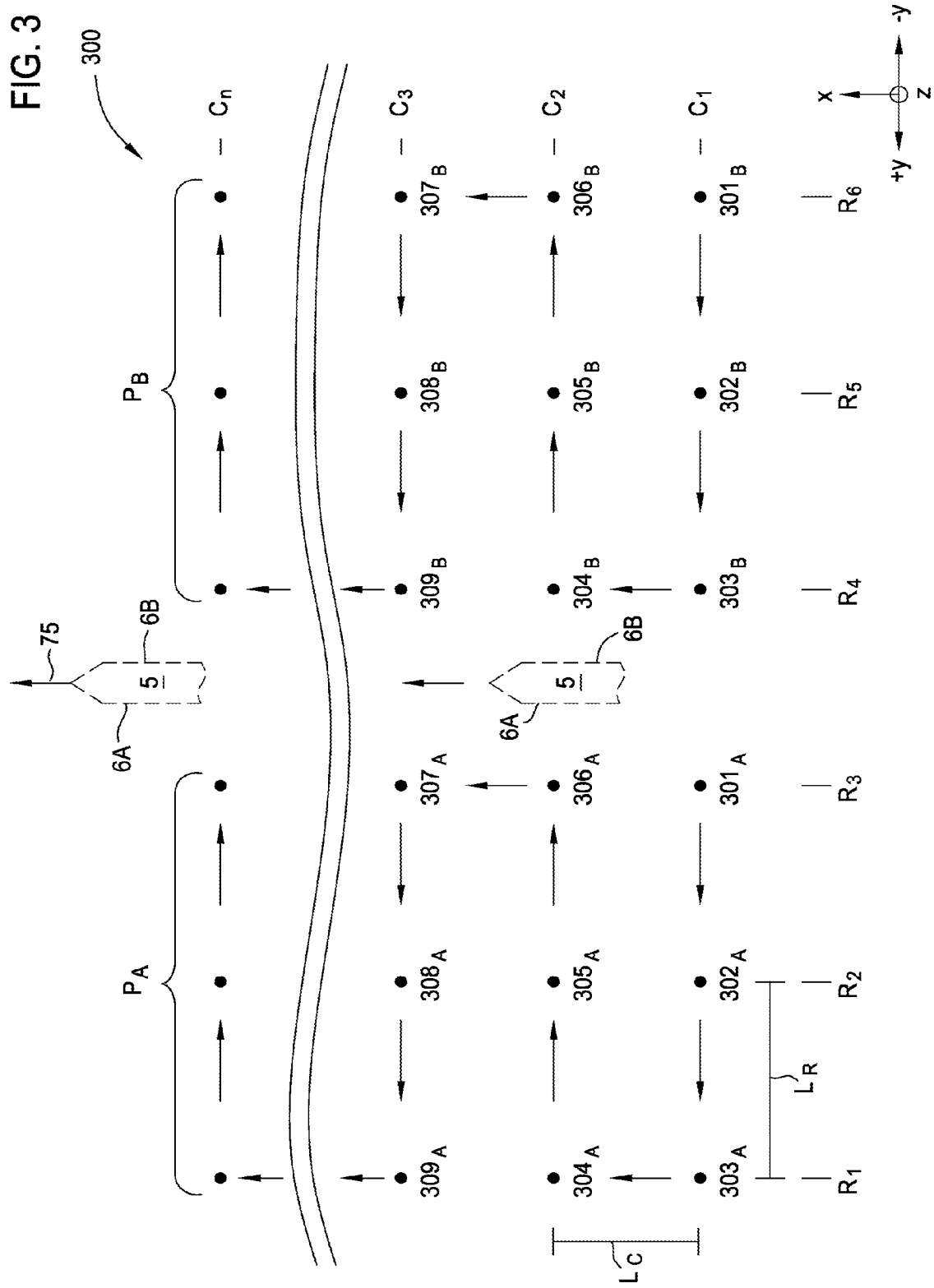
FIG. 3 is a schematic plan view of an embodiment of a seismic sensor device layout.

FIG. 3 is a schematic plan view of one embodiment of a seismic sensor device layout 300 which, in one embodiment, comprises a plurality of receiver lines (rows $R_1$-$R_6$). Points 301A-309A represent locations for placement of seismic sensor devices on a seabed along the port side 6A of the first vessel 5 and points 301B-309B represent locations for placement of seismic sensor devices on the seabed along the starboard side 6B of the first vessel 5. While not shown, an ROV operating on the port side 6A and an ROV operating on the starboard side 6B facilitate placement of the seismic sensor devices at the points 301A-309A and 301B-309B.

In this embodiment, seismic sensor device placement by the ROV 35A starts at point 301A on the port side 6A and placement of the seismic sensor devices by the ROV 35B on the starboard side 6B starts at point 301B. The port side 6A and starboard side 6B placement then proceeds in the +Y direction to points 302A and 302B, respectively. The port side 6A pattern (and starboard side pattern) then proceeds in a +Y direction to point 303A (and point 303B), then in the X direction to point 304A (and point 304B), then in the −Y direction to point 305A and point 306A (points 305B and 306B). In this embodiment, identical X-Y patterns $P_A$ and $P_B$ are defined by points 301A-307A on the port side 6A and points 301B-307B on the starboard side 6B. A repeating X-Y pattern is then executed at 307A and 307B until a sufficient number of columns $C_n$ are formed.

Figure 4:
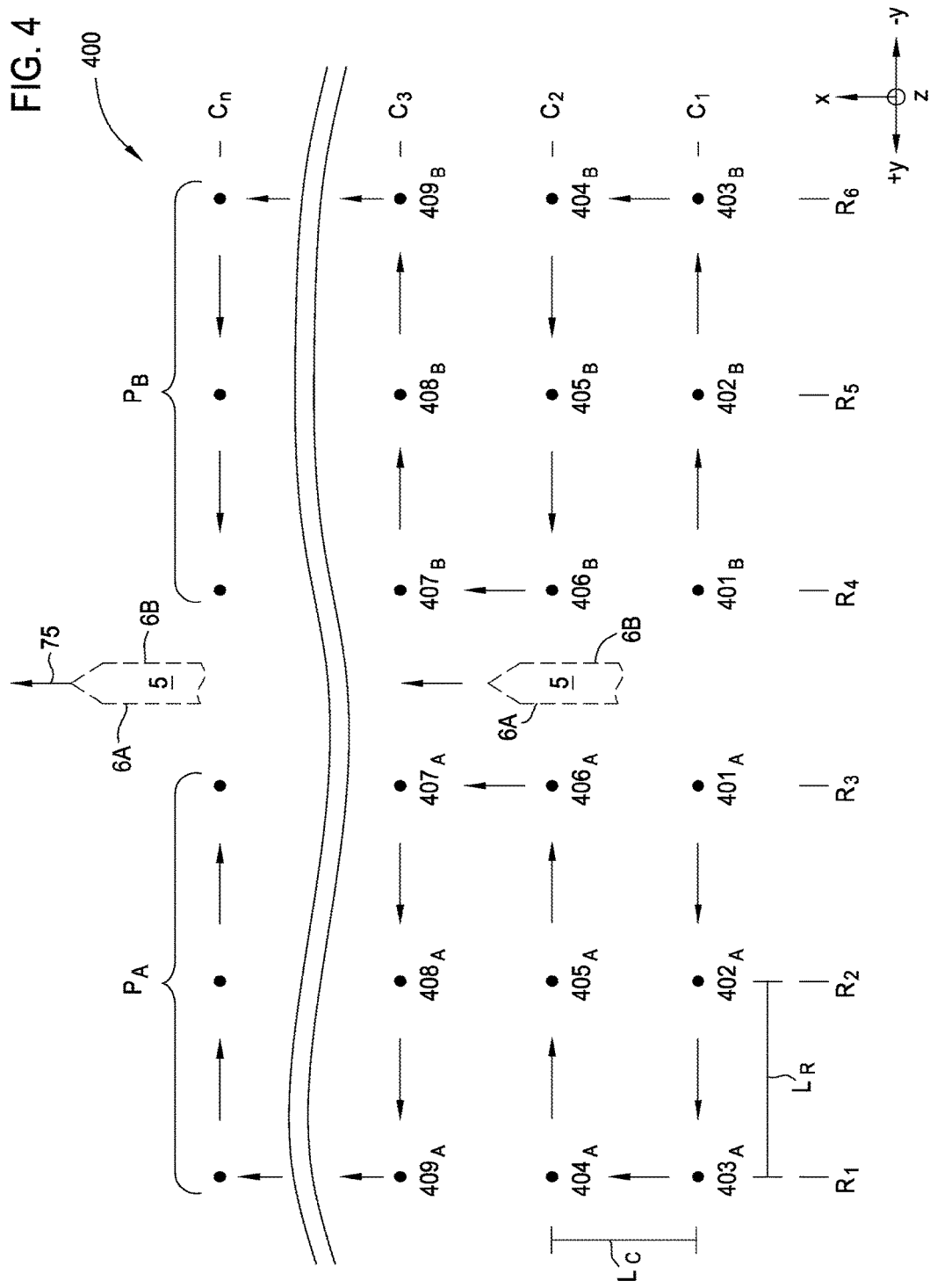
FIG. 4 is a schematic plan view of an embodiment of a seismic sensor device layout.

FIG. 4 is a schematic plan view of another embodiment of a seismic sensor device layout 400 which, in one embodiment, comprises a plurality of receiver lines (rows $R_1$-$R_6$). Points 401A-409A represent locations for placement of seismic sensor devices on a seabed along the port side 6A of the first vessel 5 and points 401B-409B represent locations for placement of seismic sensor devices on the seabed along the starboard side 6B of the first vessel 5. While not shown, an ROV operating on the port side 6A and an ROV operating on the starboard side 6B facilitate placement of the seismic sensor devices at the points 401A-409A and 401B-409B.

In this embodiment, the port side 6A placement by the ROV 35A starts at point 401A and the starboard side 6B placement by the ROV 35B starts at point 401B. The port side placement then proceeds in the +Y direction to point 402A and 403A, then in the X direction to point 404A, then in the −Y direction to point 405A and point 406A. The starboard side 6B placement proceeds in the −Y direction to point 402B and 403B, then in the X direction to point 404B, then in the +Y direction to 405B and 406B. In this embodiment, a mirror-image of X-Y patterns $P_A$ and $P_B$ are defined by points 401A-407A on the port side 6A and points 401B-407B on the starboard side 6B. A repeating mirrored X-Y pattern is then executed at 407A and 407B until a sufficient number of columns $C_n$ are formed.

Figure 5:
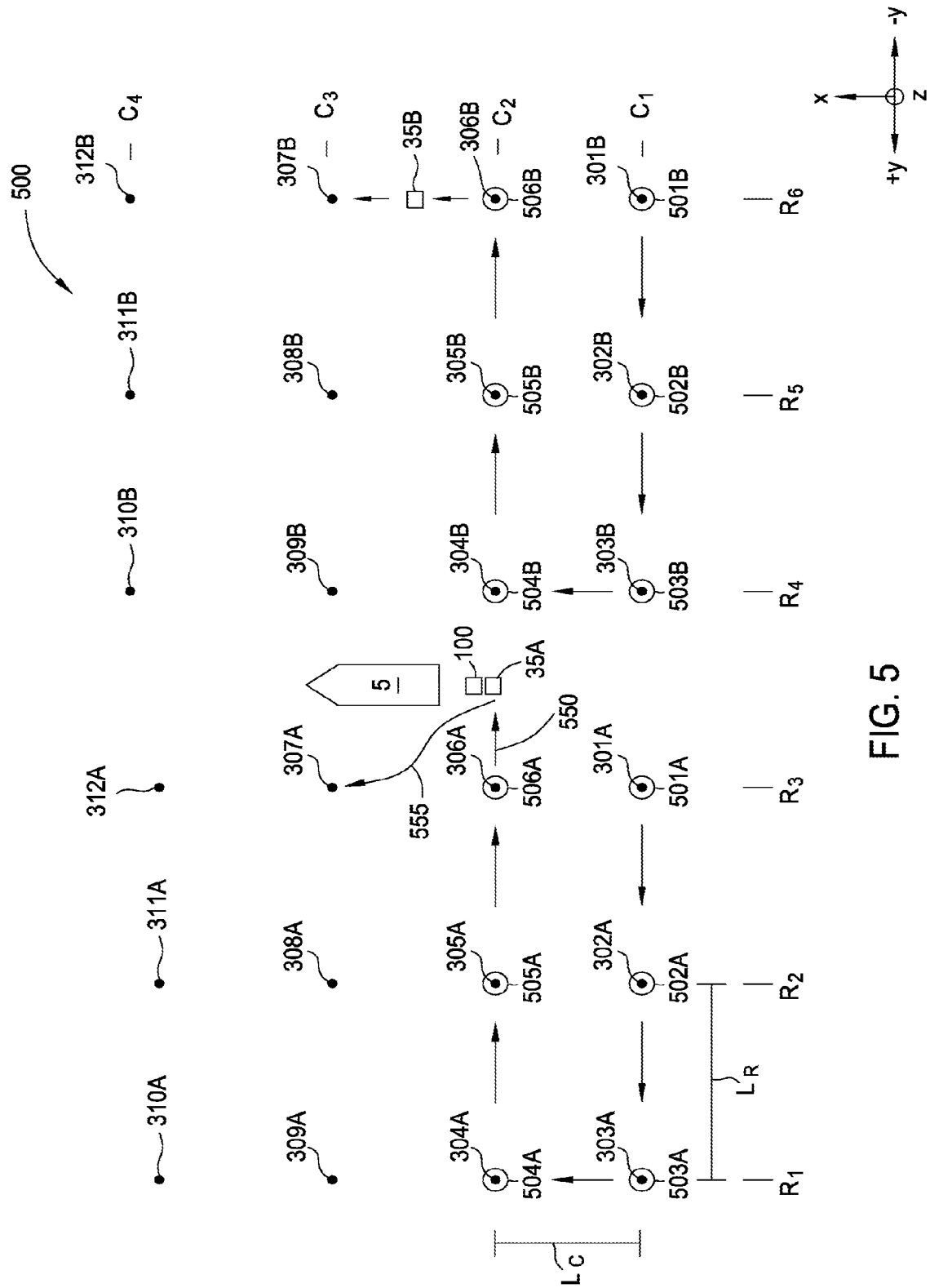
FIG. 5 is a schematic plan view of an embodiment of a seismic sensor device layout.

FIG. 5 is a schematic plan view of another embodiment of a seismic sensor device layout 500. The array layout is similar to the array layout 300 and pattern of FIG. 3 with the exception of sensor devices being laid over a portion of the points 301A-312A on the port side 6A of the first vessel 5 and a portion of the points 301B-312B on the starboard side 6B of the first vessel 5. The sensor devices that have been positioned on the respective points 301A-306A and 301B-306B are referenced as sensor devices 501A-506A on the port side 6A of the first vessel 5 and sensor devices 501B-506B on the starboard side 6B of the first vessel 5. Additionally, the port side 6A ROV 35A is shown as well as the starboard side 6B ROV 35B.

As described in FIGS. 1 and 2, each of the ROV's 35A, 35B include an integral storage compartment 40 which are not shown in the plan view of FIG. 5. In one embodiment, each of the storage compartments 40 contains a first plurality of seismic sensor devices 30. For example, the storage compartment 40 may have a capacity of about 14 seismic sensor devices. The sensor devices may be pre-loaded into each storage compartment 40 on the first vessel 5 for subsequent transfer to each point. Once the sensor devices have been laid on the points in the array layout 500, the storage compartments 40 are replenished without surfacing the ROV's 35A, 35B. In this embodiment, a transfer device 100 is towed behind the first vessel 5 to facilitate reloading of sensor devices in the storage compartment of ROV 35A. In one embodiment, the pre-loading and reloading of the storage compartments 40 of each ROV 35A, 35B with seismic sensor devices 30 are unequal to facilitate a staggered or alternating reloading operation between each ROV 35A, 35B.

In this embodiment, after sensor device 506A is deployed at point 306A, the ROV 35A is reloaded. The transfer device 100 is towed behind the first vessel 5 below the vessel 5. The ROV 35A may travel to the towed transfer device 100 in a course 550 to a position adjacent the transfer device 100. The ROV 35A and transfer device 100 are mated in a manner to transfer the seismic sensor devices to the storage compartment 40. While the ROV 35A is reloaded, the storage compartment 40 of the ROV 35B may not be depleted and continues deployment on the starboard side 6B. In this embodiment, the ROV 35A is reloaded with additional sensor devices by the transfer device 100 while the ROV 35B continues deployment of sensor devices. After the storage compartment of ROV 35A is reloaded, the ROV 35A and transfer device 100 are detached and the ROV 35A travels in a course 555 toward the next deployment point 307A. Each of the courses 550, 555 may be a lateral direction, a diagonal direction, or a linear or serpentine path. The reloading operation is staggered between the ROV's 35A and 35B to enhance efficiency of the deployment of the array. During reloading, the first vessel 5 may be stopped, slowed or maintained at a speed that was used during deployment of seismic sensor devices along the array.

Figure 6:
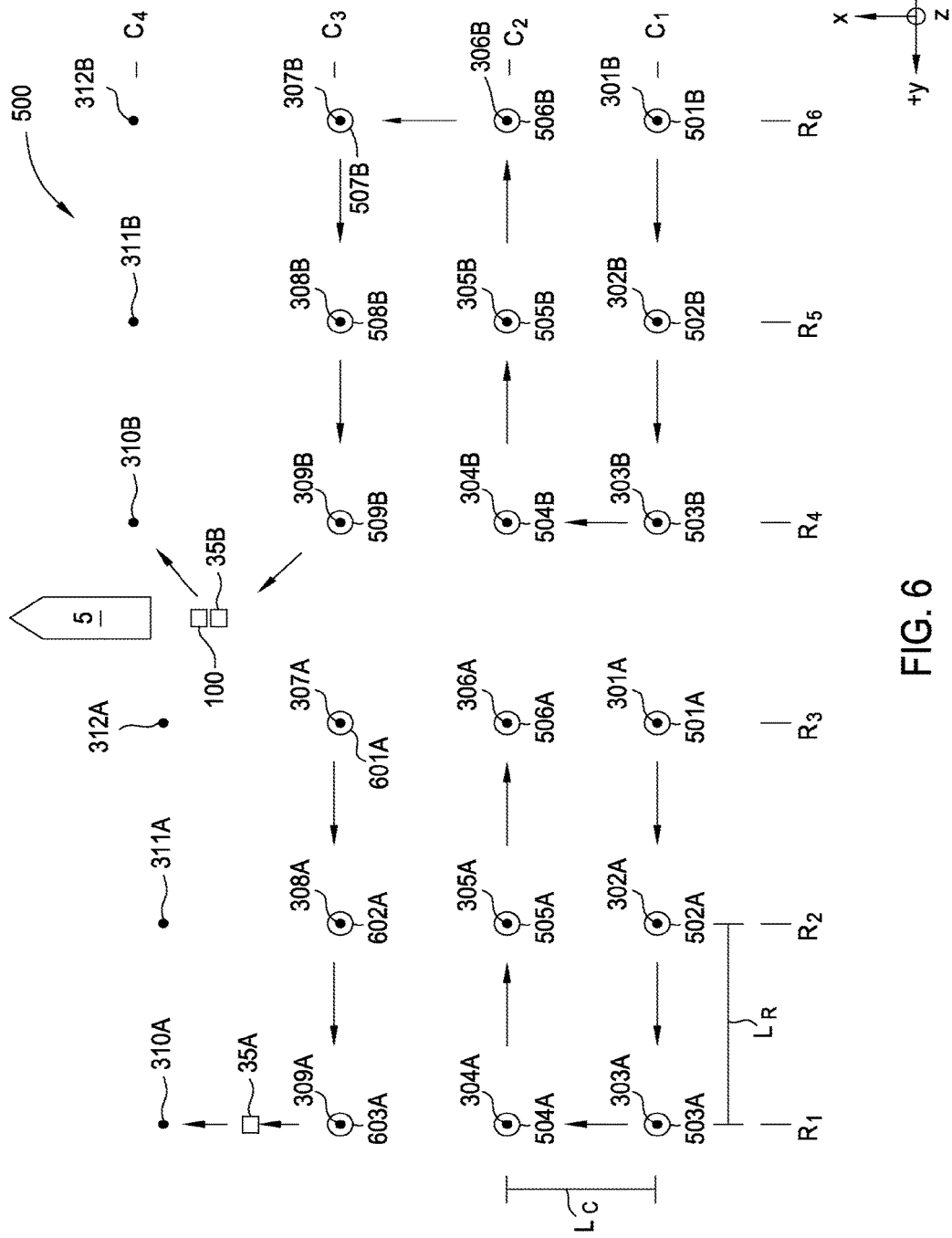
FIG. 6 is a schematic plan view showing a continuation of the seismic sensor device layout of FIG. 5.

FIG. 6 is a schematic plan view showing a continuation of the seismic sensor device layout 500 of FIG. 5. In this embodiment, after sensor device 509B is deployed at point 309B, the ROV 35B is reloaded. ROV 35A, which has been reloaded with a second plurality of sensor devices as shown in FIG. 5, continues deployment on the port side 6A (shown as sensor devices 601A-603A). In this embodiment, the ROV 35B is reloaded with a second plurality of sensor devices by the transfer device 100 while the ROV 35A continues deployment of sensor devices.

Figure 7:
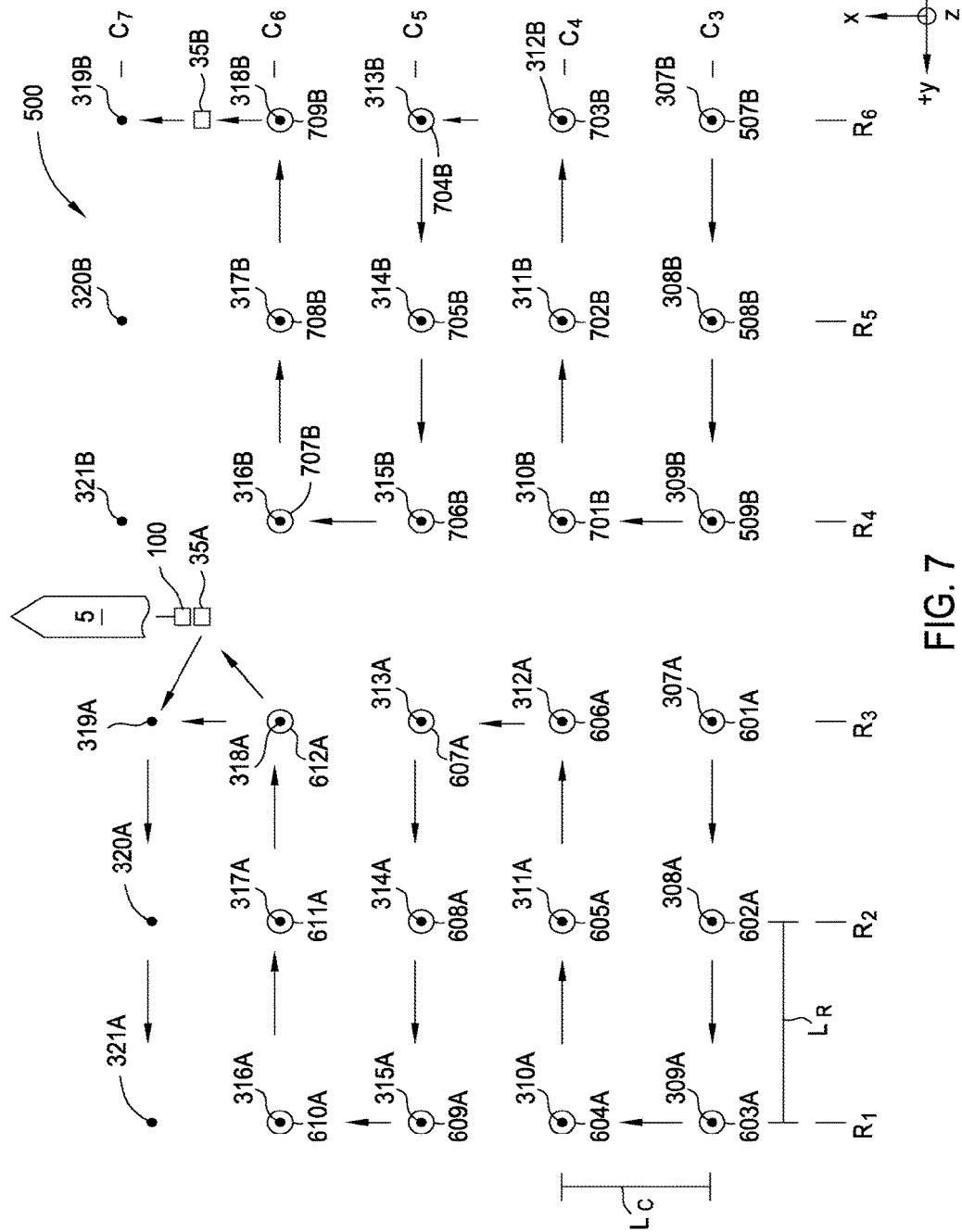
FIG. 7 is a schematic plan view showing a continuation of the seismic sensor device layout of FIG. 6.

FIG. 7 is a schematic plan view showing a continuation of the seismic sensor device layout 500 of FIG. 6. In this embodiment, after sensor device 612A is deployed at point 318A, the ROV 35A is reloaded. ROV 35B, which has been reloaded with a second plurality of sensor devices, continues deployment on the starboard side 6B (shown as sensor devices 701B-709B). In this embodiment, the ROV 35A is reloaded with a third plurality of sensor devices by the transfer device 100 while the ROV 35B continues deployment of sensor devices.

As shown in the embodiments of FIGS. 5-7, eighteen sensor devices have been deployed at points 301A-318A by ROV 35A and eighteen sensor devices have been deployed at points 301B-318B by ROV 35B for a total of thirty six sensor devices in one-pass of the vessel. The reloading operation to replenish the ROV storage compartment is alternated between the ROV's 35A, 35B to enhance efficiency of the layout of the array. During the deployment of the rows, the speed of the first vessel 5 may be maintained at a substantially constant speed.

In one operational embodiment, an example of deploying sensor devices using the embodiments described in FIGS. 5-7 will be described. The first vessel 5 speed may be maintained or averaged at about 0.25 knots along direction 75 while a port side 6A ROV 35A and a starboard side ROV 35B may be operated at speeds of less than about 10 knots. The distances $L_R$ and $L_C$ between points may be about 400 meters. A first plurality of sensor devices 30, consisting of six sensor devices, may be preloaded into ROV 35A and a first plurality of sensor devices 30, consisting of nine sensor devices, may be preloaded into ROV 35B. Seismic sensor devices 501A-506A may be deployed and ROV 35A should be reloaded with a second plurality of seismic sensor devices as shown in FIG. 5. The second plurality of seismic sensor devices may comprise twelve sensor devices. In this embodiment, the first vessel 5 may be maintained at about 0.25 knots during the reloading operation.

The first vessel 5 proceeds in the direction 75 and ROV 35A continues deployment of seismic sensor devices beginning at point 307A while ROV 35B places a seismic sensor device 507B at point 307B as shown in FIG. 6. Both ROV's 35A and 35B may continue deployment along the patterns until deployment of seismic sensor device 509B by ROV 35B.

After deployment of seismic sensor device 509B by ROV 35B, ROV 35B may be reloaded with a second plurality of seismic sensor devices, as shown in FIG. 6. The second plurality of sensor devices may comprise another twelve seismic sensor devices. The first vessel 5 may be maintained at about 0.25 knots during the reloading operation. The first vessel 5 proceeds in the direction 75 and ROV 35B may continue deployment of seismic sensor devices beginning at point 310B while ROV 35A places a seismic sensor device 604A at point 310A as shown in FIG. 7. Both ROV's 35A, 35B may continue deployment along the pattern as shown. After ROV 35A deploys a sensor device 612A at point 318A, the ROV 35A may be reloaded with a third plurality of seismic sensor devices, for example, another twelve seismic sensor devices. The pattern may continue until a sufficient number of columns are completed. After completion, the second vessel (not shown) may begin shooting, which may involve at least 24 passes of the second vessel. During the shooting, the first vessel may begin another one pass lay of another six receiver lines.

Figure 8:
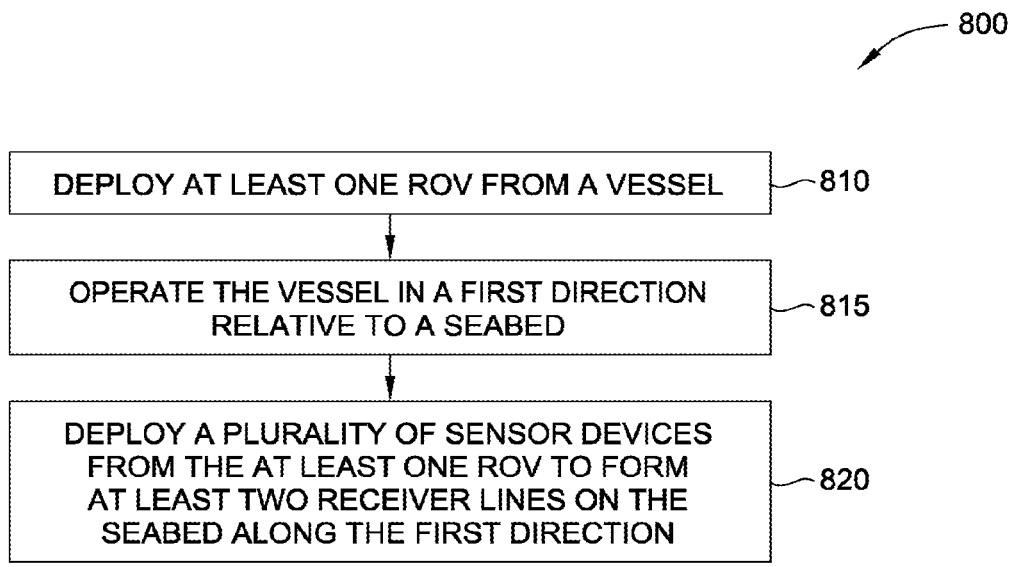
FIG. 8 is a flow chart showing an embodiment of a deployment method.

FIG. 8 is a flow chart showing one embodiment of a deployment method 800. The method 800 may be used to deploy a plurality of seismic sensor receiver lines in one pass of a first vessel as described in the above embodiments. At 810, at least one ROV is deployed from a vessel. At 815, the vessel is operated in a first direction relative to a seabed. The first direction may be a compass heading or other linear or substantially linear direction. At 820, a plurality of seismic sensor devices are deployed from the at least one ROV to form at least two receiver lines on the seabed along the first direction. In one embodiment, the at least two receiver lines are substantially parallel to the first direction. In another embodiment, the at least two receiver lines are substantially parallel to each other.

Figure 9:
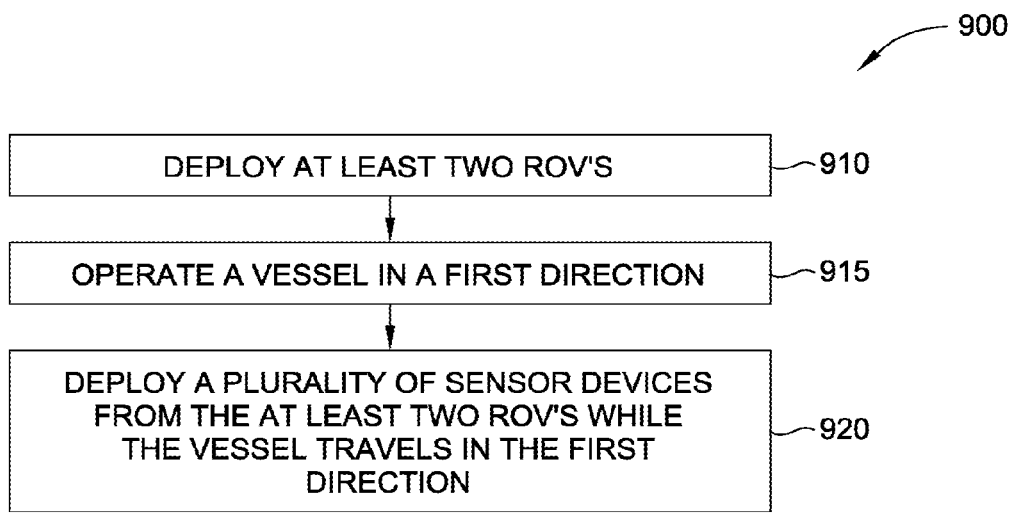
FIG. 9 is a flow chart showing an embodiment of a deployment method.

FIG. 9 is a flow chart showing another embodiment of a deployment method 900. The method 900 may be used to deploy a plurality of seismic sensor receiver lines in one pass of a first vessel as described in the above embodiments. The method begins at 910 using at least two ROV's coupled to the first vessel in a body of water. At 915, the vessel operates in a first direction in the body of water. The first direction may be a compass heading or other linear and/or directional path. At 920, a plurality of sensor devices are deployed from the at least two ROV's while the vessel travels in the first direction. The plurality of sensor devices may be deployed in a plurality of receiver lines comprising a pattern. The pattern may be an X/Y pattern in a mirror-image, an identical X/Y pattern, or other pattern using the at least two ROV's. In one embodiment, the plurality of receiver lines are substantially parallel to the first direction. In another embodiment, the plurality of receiver lines are substantially parallel to each other.

The deployment of multiple receiver lines has been determined empirically as described in FIG. 1A. While setting the vessel speed to safe operating speed, the number of seismic sensor devices deployed in a specific time period was greater than the conventional deployment method in the same time period. In one example according to the embodiment described in FIG. 1A, two receiver lines were deployed at a rate of about ten seismic sensor units per hour, while the conventional one pass method of deploying ten seismic sensor units in a single receiver line took approximately five hours. In one specific example using the embodiment described in FIG. 1A, two receiver lines were deployed having 5 seismic sensor devices each (ten seismic sensor units total) at 400 meter spacings (distances $L_R$ and $L_C$). The vessel 5 was slowed to about one-half of the conventional speed. In this example, the one pass deployment of the two receiver lines resulted in a time savings of about thirty minutes as compared to conventional deployment of a single receiver line (ten seismic sensor units) in one pass at twice the travel speed. This time saving may be extrapolated to multiple columns up to and including several miles and when the receiver lines are completed, the second vessel will be utilized for many hours or days, dependent upon the number of columns or length of the receiver lines. While the second vessel is shooting, the first vessel continues to deploy other receiver lines in one pass. Thus, a buffer time for the first vessel may be created using the one pass multiple receiver line deployment method.

Using the embodiments described herein, the deployment time of seismic sensor devices is significantly minimized, which allows the second vessel to operate with minimal or no idle time waiting for receiver line placement. The decreased deployment time also minimizes the time the first vessel is operating on the water. The decreased time on the water also minimizes labor costs and fuel usage. The decreased time on the water also allows seismic array layouts to be completed in a time frame that coincides with fair weather windows. Thus, deployment (and/or retrieval) of the sensor devices is less likely to be suspended due to periods of foul weather. As the seismic sensor devices include batteries with a limited operational time, the shortened deployment time also increases the probability that the survey can be complete before exhaustion of the batteries of the seismic sensor devices. For example, a seismic survey utilizing one thousand sensor devices may be completed in one week, including deployment and shooting, as opposed to conventional deployment methods which may take many weeks to cover the same area. Retrieval of the sensor devices may be completed in another week using the methods described herein.

Figure 10A:
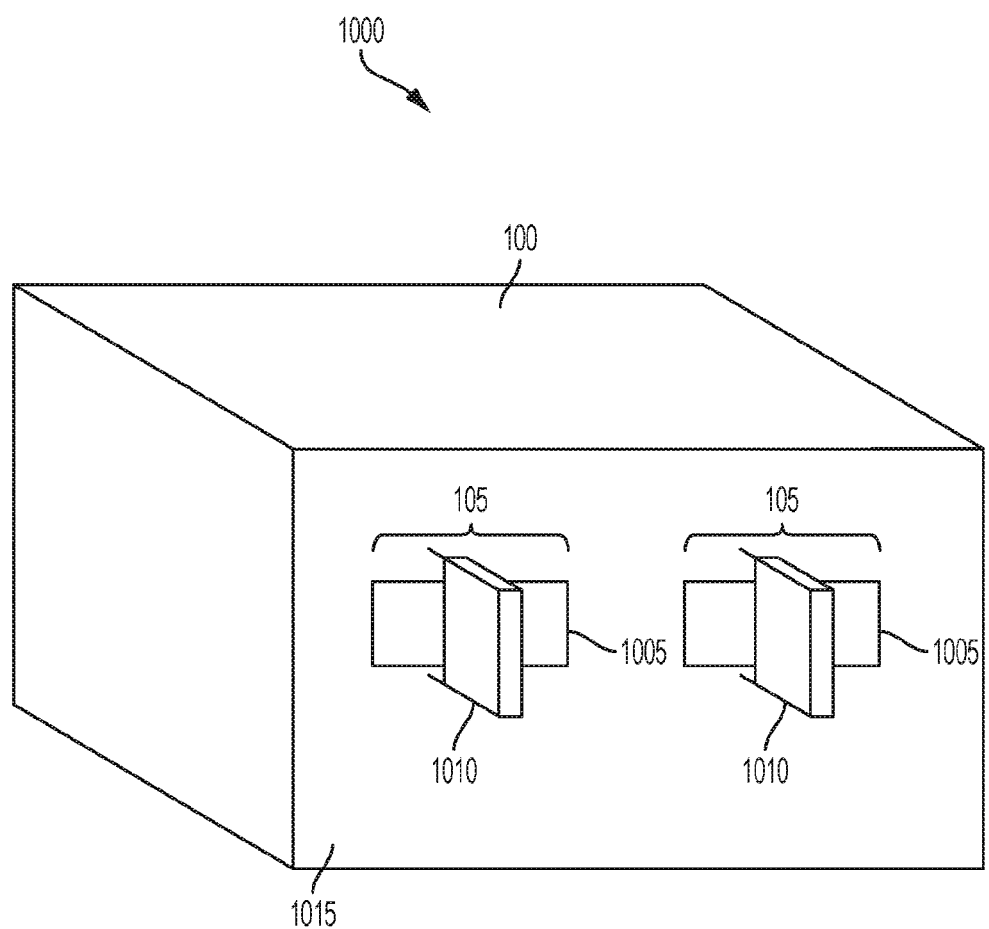
FIG. 10A is a system for acquiring seismic data comprising a propulsion system, in accordance with an embodiment.

FIG. 10A is a system for acquiring seismic data comprising a propulsion system, in accordance with an embodiment. The system 1000 illustrated in FIG. 10A can include one or more component of the system illustrated in FIG. 1A or 1B. The system 1000 can include one or more steering devices 1010 and one or more propulsion systems 105. The steering device 1010 can steer or orient the seismic sensor transfer device 100 as the propulsions system 105 generates force to move the seismic sensor transfer device 100.

The propulsion system 105 can include a mechanism to generate force, such as a propeller 1005, a thruster 1005, a paddle 1005, an oar 1005, a waterwheel 1005, a screw propeller 1005, a fixed pitch propeller 1005, a variable pitch propeller 1005, a ducted propeller 1005, an azimuth propeller 1005, a water jet 1005, a fan 1005, or a centrifugal pump 1005. The propulsion system 105 can include a fluid propulsion system 1005 such as a pump jet 1005, hydrojet 1005, or water jet 1005 that can generate a jet of water for propulsion. The propulsion system 105 can include a mechanical arrangement having a ducted propeller with a nozzle 1005, or a centrifugal pump and nozzle 1005. The propulsion system 105 can have an intake or inlet 1005 (e.g., facing a bottom of the seismic sensor transfer device 100)

that allows water to pass into the propulsion system 105. The water can enter the pump of the propulsion system through the inlet. The water pressure inside the inlet 1005 can be increased by the pump and forced backwards through a nozzle. The propulsion system 105 can include a reversing bucket. With the use of a reversing bucket, reverse thrust can be generated. The reverse thrust can facilitate slowing movement of the seismic sensor transfer device 100 as the movement of the vessel 5 slows.

The system 1000 can include one or more propulsion systems 105. The propulsions system 105 can be integrated with, or mechanically coupled to, a portion of the seismic sensor transfer device 100. The propulsion system 105 can be built into a portion of the seismic sensor transfer device 100. The propulsion system 105 can be attached onto the portion of the seismic sensor transfer device 100 using an attachment or coupling mechanism such as one or more screws, bolts, adhesives, grooves, latches, or pins.

The system 1000 can include multiple propulsion systems 105. For example, the system 1000 can include one or more propulsions systems 105 on the first cap 204, seismic sensor transfer device 100, or second cap 228. The multiple propulsions systems 105 can be centrally controlled or individually controlled by a control unit 110. The multiple propulsions systems can be independently activated or synchronously activated.

The system 1000 can include a propulsion system 105 located on a portion of the seismic sensor transfer device. For example, the propulsion system 105 can be located on a back end 1015 of the seismic sensor transfer device 100 that faces a direction opposite the direction of movement. The propulsion system 105 can be located in the center of the back end 1015, on a left side of the back end 1015 or a right side of the back end 1015. The propulsion system 105 can, in some embodiments, span a width of the back end 1015. The propulsion system 105 can be mechanically coupled to the back end 1015, extend off from the back end 1015, or be integrated or built-into the back end 1015. The propulsions system 105 can be removably, mechanically coupled to the back end 1015. The propulsions system 105 can be permanently or fixedly mechanically coupled to the back end 1015. In some embodiments, the back end 1015 can be removably coupled to the seismic sensor transfer device 100, while the propulsion system 105 is fixedly coupled to, or integrated with, the back end 1015.

The seismic sensor transfer device 100 can include two propulsion systems 105 (or two propulsion systems 105 can be attached to the back end 1015). For example, a first propulsions system can be located on the left side of the back end 1015, and a second propulsion system can be located on the right side of the back end 1015. The two propulsion systems 105 can be separated by a predetermined distance. The predetermined distance of separation can facilitate allowing the two propulsion systems 105 to move the system 1000 in a direction. For example, the predetermined distance of separation can allow the two propulsion systems 105 to steer the seismic sensor transfer device 100 by allowing a first propulsions system 105 to generate a greater force relative to a second propulsions system 105 on the back end 1015. By generating different amounts of force, the two propulsion systems 105 can steer or control a direction of movement of the system 1000 or seismic sensor transfer device 100.

The different amounts of force generated by the two propulsion systems 105 on the seismic sensor transfer device 100 can facilitate orienting the system 1000 in a direction. For example, as an underwater vehicle or skid system approaches the system 1000 to retrieve or load nodes 30, the two propulsion systems 105 can facilitate orienting an opening of the seismic sensor transfer device 100 such that the opening can align with a conveyor or arm of the underwater vehicle.

The system 1000 can include one or more steering devices 1010. The steering device 1010 can refer to a steering apparatus 1010 that includes multiple components. The steering device 1010 can receive instructions from the propulsion system 105 or a control unit 110. The steering device 1010 can include, for example, a rudder. In some embodiments, the steering device 1010 can include fins or runners. For example, the steering device 1010 can include an actuator, spring-mechanism, or hinge that can pivot, rotate or change the orientation of one or more of the fins, runners, or rudders to steer the seismic sensor transfer device 100.

The steering device 1010 can use the propulsion system 105, or component thereof, to steer the system 1000. For example, the propulsion system 105 can include a nozzle and pump-jets. The nozzle can provide the steering of the pump-jets. Plates or rudders 1010 can be attached to the nozzle in order to redirect the water flow from one side to another side (e.g., port and starboard; right and left). The steering device 1010 can function similar to air thrust vectoring to provide a pumpjet-powered system 1000 with increased agility in the aqueous medium.

Figure 10B:
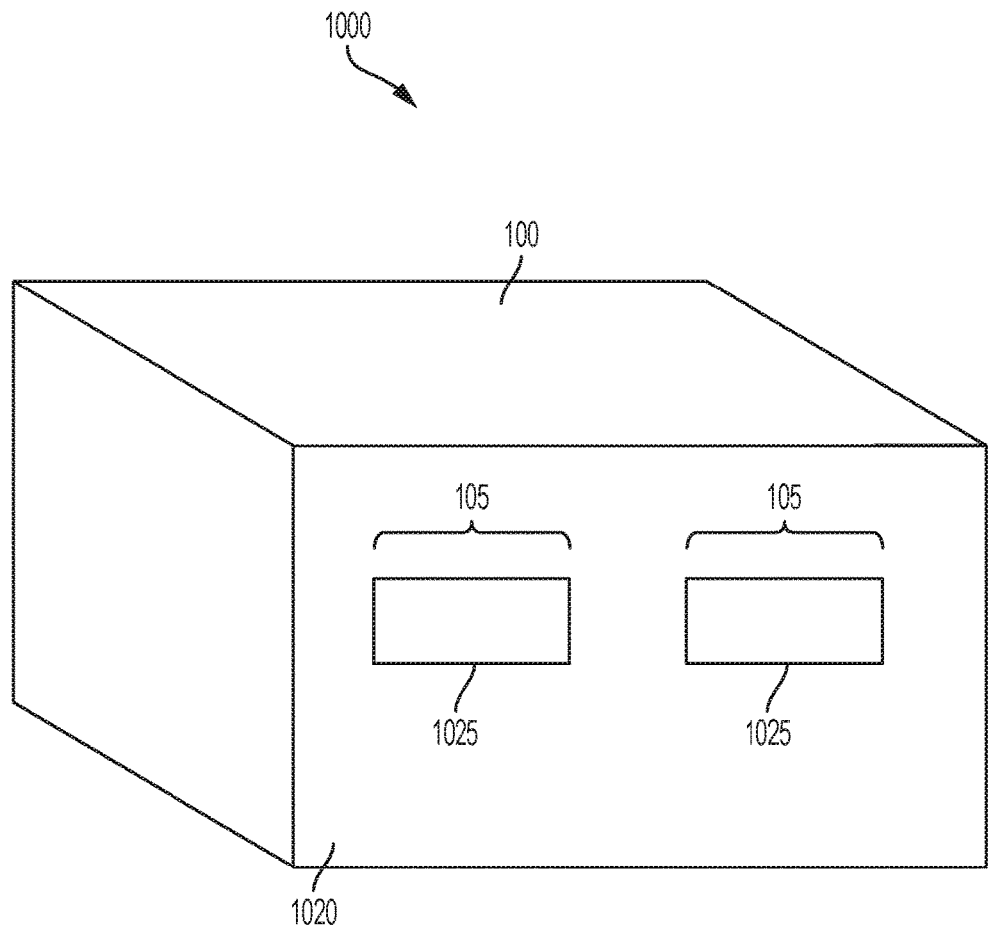
FIG. 10B is a system for acquiring seismic data comprising a propulsion system, in accordance with an embodiment.

FIG. 10B is a back side perspective view of a system for acquiring seismic data comprising a propulsion system, in accordance with an embodiment. The propulsion system 105 can include a front end 1020 and a back end 1015. The back end 1015 can include an inlet 1005, and the front end 1020 can include an outlet 1025. Water can go into the inlet 1005 and flow out of the outlet 1025. The propulsion system 105 can include an engine or a pump that receives water via the inlet 1005, and pumps water out via outlet 1025 to form a jet stream that can generate force to move the system 1000 or seismic sensor transfer device 100 thereof.

The system 1000 can include one or more pairs of inlets 1005 and outlets 1025. The pair of inlet 1005 and outlet 1025 can be located on the seismic sensor transfer device 100. The inlet 1005 can be connected to the outlet 1025 by a tube or pipe. An engine can be located in between the inlet 1005 and outlet 1025 to generate force to draw water into the inlet and push water out of the outlet to thrust the seismic sensor transfer device 100 or system 1000 in a direction.

Figure 11:
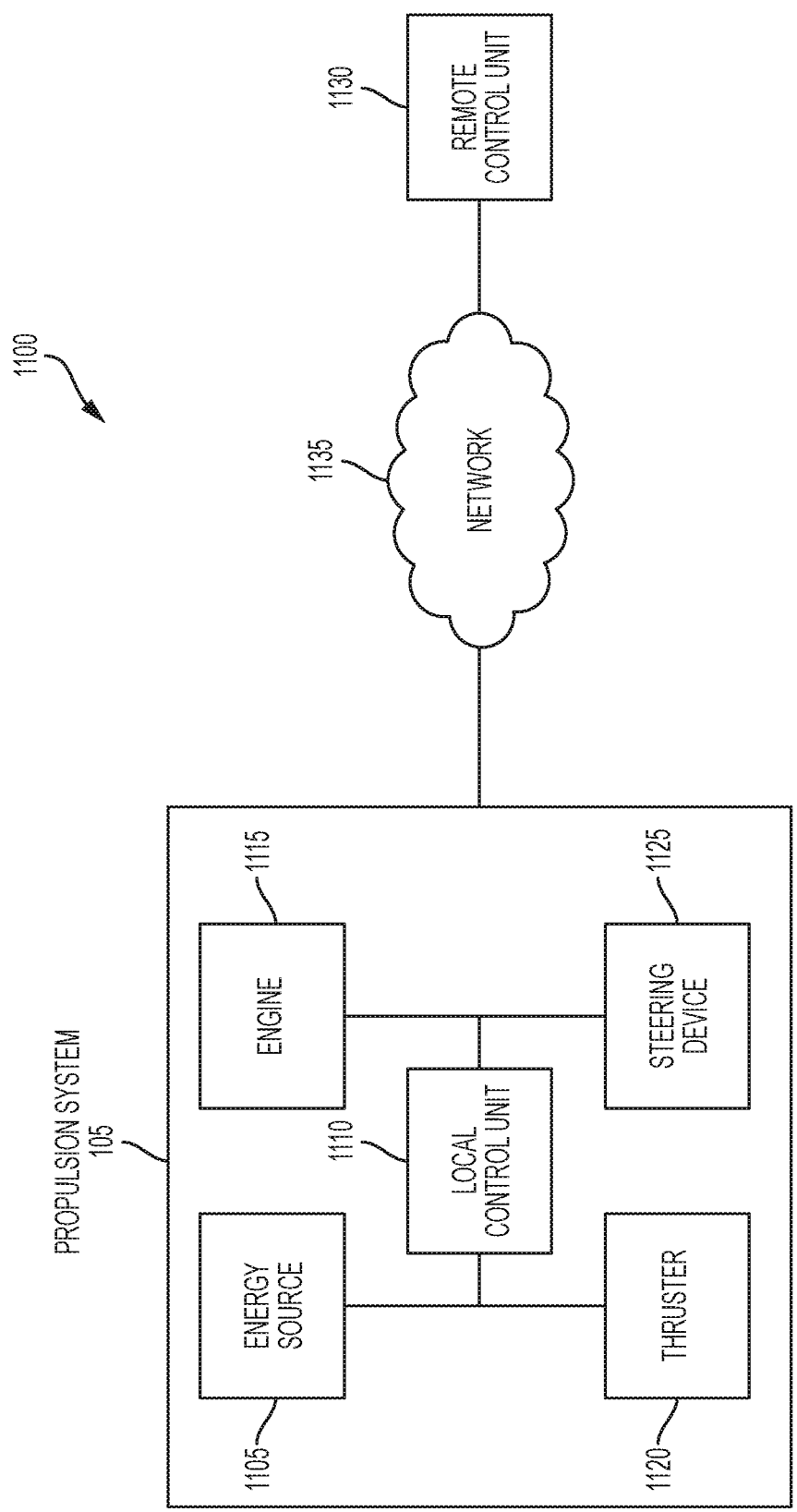
FIG. 11 is a block diagram of an embodiment of a system for acquiring seismic data from a seabed.

FIG. 11 is a block diagram of an embodiment of a system for acquiring seismic data from a seabed. The system 1100 can include a propulsion system 105. The propulsion system 105 can include one or more of at least one energy source 1105, at least one local control unit 1110, at least one engine 1115, at least one thruster 1120, and at least one steering device 1125. The propulsion system 105 can communicate with a remote control unit 1130 via a network 1135. For example, the propulsion system 105 can receive, via network 1135, an instruction from remote control unit 1130 to generate force to move a transfer device 100. The local control unit 1110 can receive the instruction and, responsive to the instruction, cause the engine 1115 to convert energy provided by the energy source 1105 into force. The engine 1115 can convey the energy or force to a thruster 1120, such as a propeller or pump.

The propulsion system 1100 can include an energy source 1105. The energy source 1105 can include a battery, fuel, fossil fuel, petroleum, gasoline, natural gas, oil, coal, fuel cell, hydrogen fuel cell, solar cell, wave power generator, hydropower, or uranium atoms (or other fuel source for a nuclear reactor). The energy source 1105 can be located on the transfer device 100. The energy source 1105 can be located on the vessel 5, and the vessel 5 can provide power to the engine 1115 via a power cable, such as cable 70.

The energy source 1105 can include a sensor or monitor that measures an amount of power or fuel remaining in the energy source 1105. The sensor or monitor can provide an indication as to the amount of fuel or power remaining in the energy source 1105 to the local control unit 1110. The local control unit 1110 can conserve the energy source 1105 by reducing the amount of force generated using energy from the energy source. The local control unit 1110 can provide the indication of the amount of fuel remaining to the remote control unit 1130.

The propulsion system 105 can include an engine 1115. The engine 1115 can convert energy provided by the energy source 1105 to mechanical energy or force. The engine 1115 can convert the energy provided by the energy source 1105 to mechanical energy responsive to an instruction from the local control unit 1110 or remote control unit 1130.

The engine 1115 can include a motor. The engine 1115 can include a heat engine, internal combustion engine, or external combustion engine. The engine 1115 can include an electric motor that converts electrical energy into mechanical motion. The engine 1115 can include a nuclear reactor that generates heat from nuclear fission. The engine 1115 can include a pneumatic motor that uses compressed air to generate mechanical motion. The engine 1115 can use chemical energy to create force.

The engine 1115 can transfer the mechanical energy to a thruster 1120. The thruster 1120 can include any device or mechanism that can generate force to move the seismic sensor transfer device 100 in a direction through the aqueous medium. The thruster can include a propeller, a paddle, an oar, a waterwheel, a screw propeller, a fixed pitch propeller, a variable pitch propeller, a ducted propeller, an azimuth propeller, a water jet, a fan, or a pump. The engine 1115 can provide the thruster 1120 with mechanical energy to generate force. For example, the engine 1115 can provide mechanical energy to spin or rotate a propeller. The engine 1115 can provide mechanical energy to a pump to generate pressure to create a water jet that propels or moves the seismic sensor transfer device 100 in a desired direction.

The propulsion system 105 can include a steering device 1125 (e.g., steering device 1010). The steering device 1125 can include a rudder or use a fin, plate or runner as a rudder. The steering device 1125 can steer the case by generating greater force on one side of the seismic sensor transfer device 100 relative to another side of the seismic sensor transfer device 100. For example, the seismic sensor transfer device 100 can have two propulsion systems 105 or two thrusters 105 separated by a distance. By generating greater force via one of the thrusters 105 relative to the other thruster 105, the seismic sensor transfer device 100 can be steered through the aqueous medium.

The propulsion system 105 can include a local control unit 1110. In some embodiments, the propulsion system 1100 can include a local control unit 1110 and a remote control unit 1130. In some embodiments, the propulsion system 1100 may include one of the local control unit 1110 or the remote control unit 1130. The local control unit 1110 can include one or more function or component depicted in FIG. 13. The local control unit 1110 can be designed and constructed to cause the engine 1115 to convert the energy provided by energy source 1105 to mechanical energy to push surrounding water away from the seismic sensor transfer device 100 in a direction opposite a direction of movement of the seismic sensor transfer device 100. The engine 1115 can cause a thruster 1120 to create force that moves the water in a direction opposite to the desired direction of motion of the case.

The local control unit 1110 can monitor the speed or velocity of the seismic sensor transfer device 100. The local control unit 1110 can include a GPS sensor, gyroscope, or accelerometer. The GPS sensor can receive GPS signals from a GPS satellite to determine a location of the seismic sensor transfer device 100. The GPS sensor can provide the location information (e.g., latitude and longitude coordinates) to the local control unit 1110 or the remote control unit 1130. The accelerometer can determine an acceleration, speed or velocity of the seismic sensor transfer device 100 (e.g., knots, nautical miles per hour, miles per hour, or meters per hour). The gyroscope can determine an orientation of the seismic sensor transfer device 100. The control unit 1110 can determine one or more of the location, velocity, or orientation from these components. The local control unit 1110 can use this information to determine how much force to generate to move the seismic sensor transfer device 100. The local control unit 1110 can provide this information to the remote control unit 1130, which can, in-turn, process the information and provide instructions to the local control unit 1110.

The system 1100 can include a remote control unit 1130. The remote control unit 1130 can be external to the propulsion system 105. The remote control unit 1130 can be located on the vessel 5 (e.g., control unit 110). The remote control unit 1130 can provide instructions to the propulsion system 105 to cause the propulsion system 105 to move, direct, or slow down the seismic sensor transfer device 100 or system 200. The remote control unit 1130 can receive an indication from a person or can automatically generate instructions based on a configuration, policy, or setting. For example, the remote control unit 1130 can be configured to instruct the seismic sensor transfer device 100 to follow the vessel 5 at a predetermined location relative to a portion of the vessel 5. The remote control unit 1130 can receive location information for the seismic sensor transfer device 100 from the local control unit 1110. The location information can include a velocity, location or orientation of the seismic sensor transfer device 100. The remote control unit 1130 can determine, based on the received location, velocity, or orientation information, to provide an instruction to the local control unit 1110 to adjust the location, velocity or orientation.

In some embodiments, the local control unit 1110 can monitor the location, velocity and orientation of the seismic sensor transfer device 100, and automatically instruct the thruster 1120 or engine 1115 to generate more or less force to adjust the velocity, orientation, or direction. The local control unit 1110 can monitor an orientation of the seismic sensor transfer device 100 and determine that the case is leaning to a side. For example, the seismic sensor transfer device 100 may lean to a side if the case is towed by a vessel 5 that is turning. The local control unit 1110, responsive to detecting that the seismic sensor transfer device 100 is leaning at an angle greater than a predetermined threshold (e.g., 10 degrees, 15 degrees, 20 degrees 30 degrees, 40 degrees) in a plane orthogonal to the direction of motion, can steer or thrust the seismic sensor transfer device 100 to re-orient the case.

In some embodiments, the local control unit 1110 can include one or more sensors to detect the location of the seismic sensor transfer device 100 relative to the vessel 5. For example, the control unit 1110 can include a proximity sensor to detect a location of the case relative to the vessel 5. In some embodiments, the remote control unit 1130 on the vessel can generate beacons or pings that the local control unit 1110 can detect to triangulate a position of the seismic sensor transfer device 100 relative to the vessel 5.

For example, the local control unit 1110 can include an instruction to follow an object moving through an aqueous medium, or an instruction to follow a vessel 5 towing the seismic sensor transfer device 100 through an aqueous medium. The object can include, for example, a vessel 5, buoy, water vehicle, transfer device, or skid structure. The local control unit 1110 can include sensors such as a camera, position sensor, motion sensor, proximity sensor, transducers, radar, or other sensors that allow the local control unit 1110 to determine a change in a position of the object, and move the seismic sensor transfer device 100 to follow the object at a predetermined distance from the object. In some embodiments, the remote control unit 1130 can provide an indication to the local control unit 1110 as to a change in direction, speed or position of the vessel 5. The local control unit 1110 can receive this indication of a change in direction or speed of the vessel 5, and adjust a speed or direction of the seismic sensor transfer device 100 accordingly.

The network 1135 can include a wired or wireless network. The network 1135 can include a wire such as cable 70 from the vessel 5. Instructions can be conveyed via the network 1135 using one or more communication protocols. The network 1135 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 1135 may be any type and/or form of network. The geographical scope of the network 1135 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 1135 may be an overlay network which is virtual and sits on top of one or more layers of other networks. The network 1135 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 1135 may be a type of a broadcast network, a telecommunications network, a data communication network, or a computer network. The network 1135 can include wireless communication technologies such as Bluetooth, Zigbee, or RFID. The network 1135 can allow for communication using small, low-power digital radios based on the IEEE 802.15.4 standard for WPANs, such as those based on the ZigBee standard. Systems based on the ZigBee standard can use radio-frequency (RF) and provide a long battery life and secure networking.

Figure 12:
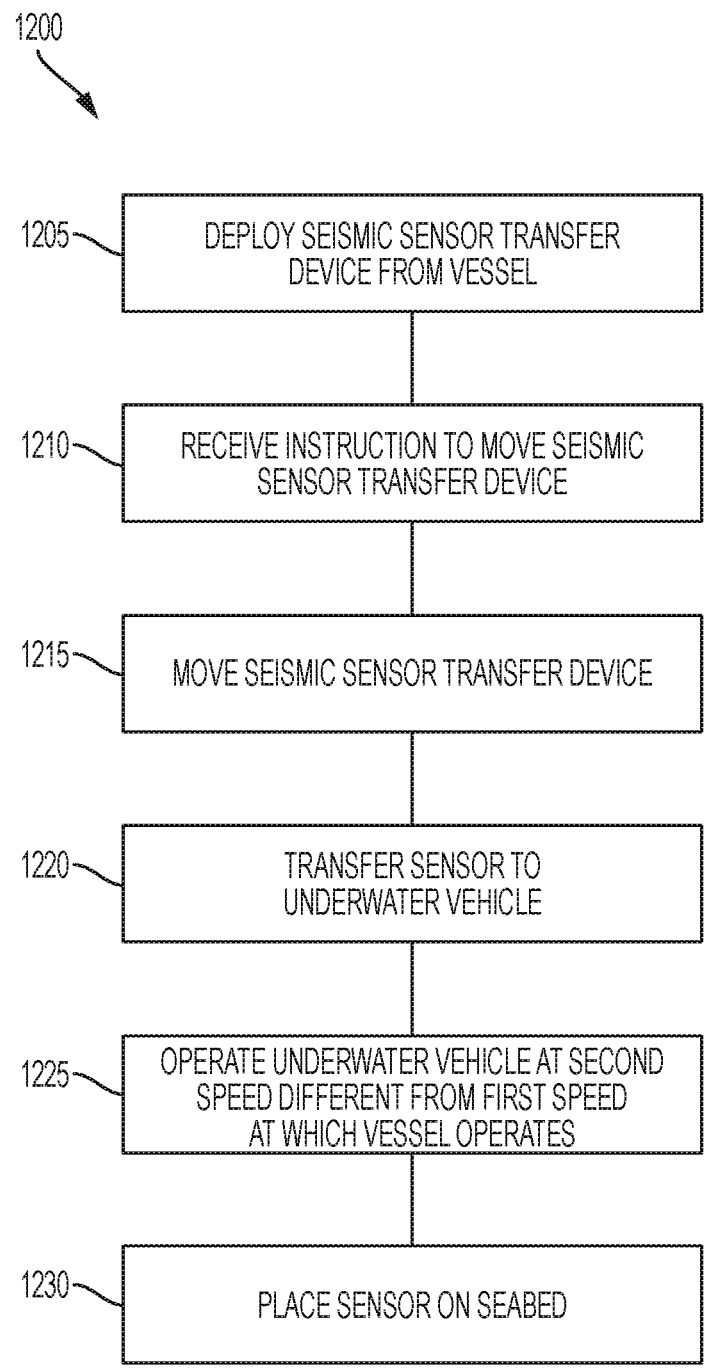
FIG. 12 is a flow diagram of an embodiment of a method for acquiring seismic data from a seabed.

FIG. 12 is a flow diagram of an embodiment of a method for acquiring seismic data from a seabed. The method 1200 can include, at act 1205, deploying, from a vessel, a seismic sensor transfer device configured to house and transport a plurality of seismic sensors. At act 1210, the propulsion system of the seismic sensor transfer device receives an instruction to move the seismic sensor transfer device. At act 1215, the propulsion system moves, responsive to the instruction, the seismic sensor transfer device. At act 1220, the underwater vehicle transfers at least one of the plurality of seismic sensors from the seismic sensor transfer device to an underwater vehicle. At act 1225, the underwater vehicle operates a second speed different from a first speed at which the vessel is operating. At act 1230, the underwater vehicle places the at least one seismic sensor on a seabed.

The propulsion system can move the case responsive to the instruction. For example, the propulsion system (e.g., via a steering device) can adjust a fin or rudder of the case to steer the case. The propulsion system can generate force or generate greater force to increase a velocity of the case. The propulsion system can reduce an amount of generated force to slow down the case. The propulsion system can generate force in a reverse direction to further slow down the case.

Figure 13:
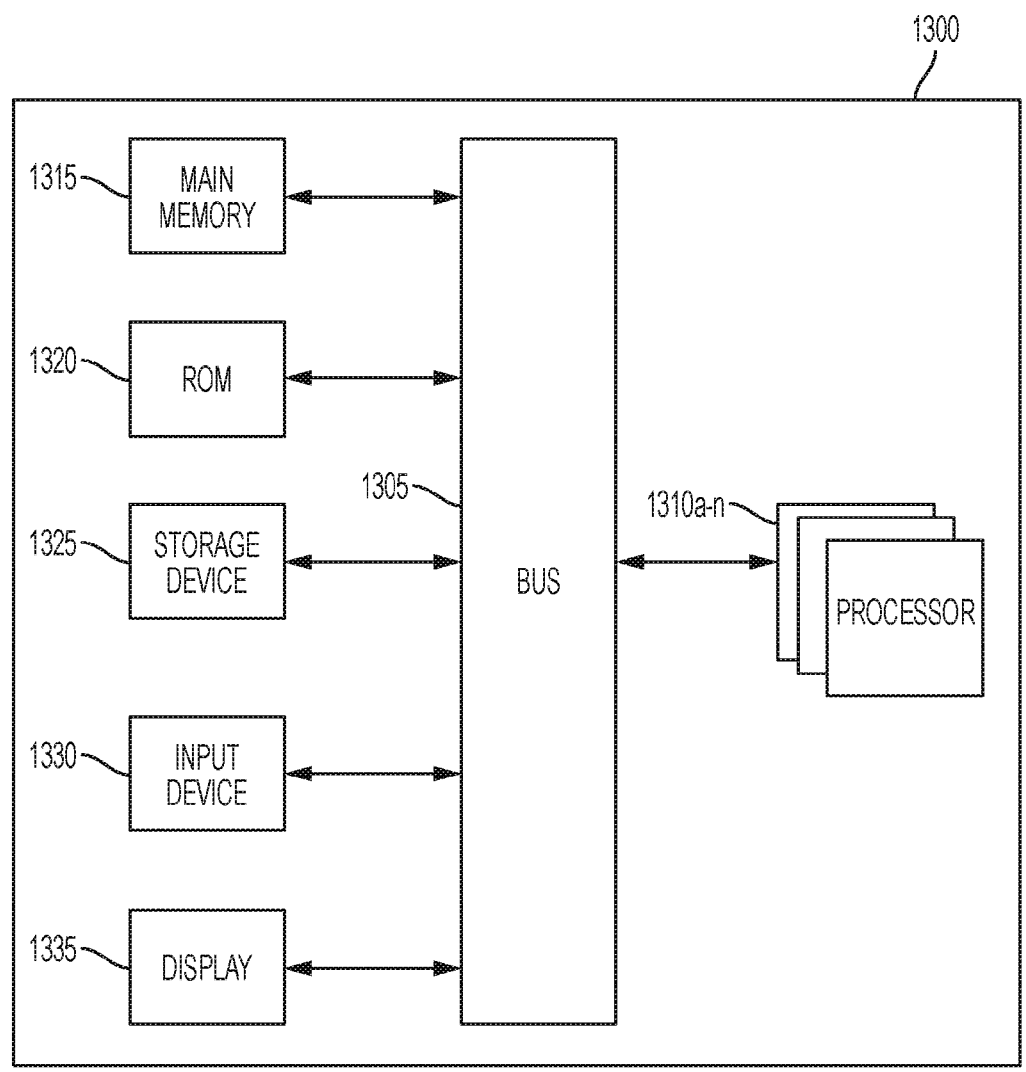
FIG. 13 is a block diagram illustrating a general architecture for a computer system that may be employed to implement various elements of the embodiments shown in FIGS. 1A, 1B, 10A, 10B, 11 and 12.

FIG. 13 is a block diagram of a computer system 1300 in accordance with an embodiment. The computer system or computing device 1300 can be used to implement one or more component, control unit, controller, sensor, interface or remote control of system 1000, system 1100, or method 1200. The computing system 1300 includes a bus 1305 or other communication component for communicating information and a processor 1310a-n or processing circuit coupled to the bus 1305 for processing information. The computing system 1300 can also include one or more processors 1310 or processing circuits coupled to the bus for processing information. The computing system 1300 also includes main memory 1315, such as a random access memory (RAM) or other dynamic storage device, coupled to the bus 1305 for storing information, and instructions to be executed by the processor 1310. Main memory 1315 can also be used for storing seismic data, binning function data, images, reports, tuning parameters, executable code, temporary variables, or other intermediate information during execution of instructions by the processor 1310. The computing system 1300 may further include a read only memory (ROM) 1320 or other static storage device coupled to the bus 1305 for storing static information and instructions for the processor 1310. A storage device 1325, such as a solid state device, magnetic disk or optical disk, is coupled to the bus 1305 for persistently storing information and instructions.

The computing system 1300 may be coupled via the bus 1305 to a display 1335 or display device, such as a liquid crystal display, or active matrix display, for displaying information to a user. An input device 1330, such as a keyboard including alphanumeric and other keys, may be coupled to the bus 1305 for communicating information and command selections to the processor 1310. The input device 1330 can include a touch screen display 1335. The input device 1330 can also include a cursor control, such as a mouse, a trackball, or cursor direction keys, for communicating direction information and command selections to the processor 1310 and for controlling cursor movement on the display 1335.

The processes, systems and methods described herein can be implemented by the computing system 1300 in response to the processor 1310 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. In some embodiments, hard-wired circuitry may be used in place of or in combination with software instructions to effect illustrative implementations. Thus, embodiments are not limited to any specific combination of hardware circuitry and software.

Although an example computing system has been described in FIG. 13, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While various inventive embodiments have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the inventive teachings are used. The foregoing embodiments are presented by way of example, and within the scope of the appended claims and equivalents thereto other embodiments may be practiced otherwise than as specifically described and claimed. The systems and methods described herein are directed to each individual feature, system, article, material, or kit, described herein. In addition, any combination of two or more such features, systems, articles, materials, kits, or methods, if such features, systems, articles, materials, kits, or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Generally, program modules include routines, programs, objects, components, data structures, or other components that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While the foregoing is directed to embodiments of the present invention, other and further embodiments of the invention may be devised without departing from the basic scope thereof, and the scope thereof is determined by the claims that follow.

What is claims is:

1. A system to deploy seismic sensors in a marine environment, comprising:
    a seismic sensor transfer device to house and transport a plurality of seismic sensors, the seismic sensor transfer device deployed from a vessel;
    a propulsion system of the seismic sensor transfer device to receive an instruction and move, responsive to the instruction, the seismic sensor transfer device; and
    an underwater vehicle to:
        transfer at least one of the plurality of seismic sensors from the seismic sensor transfer device to the underwater vehicle;
        operate at a second speed different from a first speed at which the vessel operates; and
        place the at least one of the plurality of seismic sensors on a seabed.

2. The system of claim 1, comprising:
    a control unit to provide the instruction to the propulsion system.

3. The system of claim 2, wherein the propulsion system comprises the control unit.

4. The system of claim 2, comprising:
    the control unit external to, and remote from, the seismic sensor transfer device.

5. The system of claim 4, comprising:
    the control unit configured to transmit a wired or wireless transmission comprising the instruction to the propulsion system.

6. The system of claim 1, wherein the instruction comprises an instruction to follow an object moving through an aqueous medium.

7. The system of claim 1, wherein the instruction comprises an instruction to follow the vessel that tows the seismic sensor transfer device through an aqueous medium.

8. The system of claim 1, wherein the propulsion system comprises:
    an energy source to provide energy; and
    an engine to convert the provided energy to mechanical energy to move the seismic sensor transfer device in a chosen direction.

9. The system of claim 1, wherein the propulsion system comprises:
    a means to generate force to push surrounding water away from the seismic sensor transfer device in a direction opposite a direction of movement of the seismic sensor transfer device.

10. The system of claim 1, wherein the propulsion system comprises at least one of:
    a propeller;
    a thruster;
    a paddle;
    an oar;
    a waterwheel;
    a water jet;
    a fan; or
    a pump.

11. The system of claim 1, comprising:
    a steering device to control a direction of movement of the seismic sensor transfer device.

12. The system of claim 11, wherein the steering device comprises a rudder.

13. The system of claim 11, comprising:
    a control unit configured to instruct the steering device to control the direction of the movement of the seismic sensor transfer device.

14. The system of claim 1, wherein the seismic sensor transfer device comprises at least one of a container, a drone, a skid structure, a transfer skid, a basket, a rack, a magazine, or a tray.

15. The system of claim 1, wherein the seismic sensor transfer device comprises a movable platform configured to facilitate transfer of the at least one of the plurality of seismic sensors.

16. A method of deploying seismic sensors in a marine environment, comprising:
    deploying, from a vessel, a seismic sensor transfer device configured to house and transport a plurality of seismic sensors;
    receiving, by a propulsion system of the seismic sensor transfer device, an instruction to move the seismic sensor transfer device;
    moving, by the propulsion system responsive to the instruction, the seismic sensor transfer device;
    transferring at least one of the plurality of seismic sensors from the seismic sensor transfer device to an underwater vehicle;
    operating the underwater vehicle at a second speed different from a first speed at which the vessel is operating; and placing, by the underwater vehicle, the at least one of the plurality of seismic sensors on a seabed.

17. The method of claim 16, comprising:
providing, by a control unit, the instruction to the propulsion system.

18. The method of claim 16, comprising:
providing, by a control unit remote from and external to the propulsion system, the instruction to the propulsion system via a wired or wireless transmission comprising the instruction.

19. The method of claim 16, wherein the instruction comprises an instruction to follow an object moving through an aqueous medium.

20. The method of claim 16, comprising:
controlling, by a steering device of the propulsion system, a direction of movement of the seismic sensor transfer device.

* * * * *